United States Patent [19]

Coughlin et al.

[11] Patent Number: 5,225,071
[45] Date of Patent: * Jul. 6, 1993

[54] REFORMING/DEHYDROCYCLIZATION CATALYSTS

[75] Inventors: Peter K. Coughlin, Yorktown; Regis J. Pellet, Croton, both of N.Y.

[73] Assignee: UOP, Des Plaines, Ill.

[*] Notice: The portion of the term of this patent subsequent to May 3, 2005 has been disclaimed.

[21] Appl. No.: 855,301

[22] Filed: Mar. 23, 1992

Related U.S. Application Data

[60] Continuation-in-part of Ser. No. 625,273, Dec. 10, 1990, Pat. No. 5,098,877, which is a continuation-in-part of Ser. No. 447,340, Jan. 18, 1990, abandoned, which is a continuation of Ser. No. 157,977, Feb. 19, 1988, abandoned, which is a division of Ser. No. 844,951, Mar. 27, 1986, Pat. No. 4,741,820.

[51] Int. Cl.$^5$ .......................... C10G 35/06; C07C 2/52
[52] U.S. Cl. .................................... 208/138; 208/139; 585/419
[58] Field of Search ................ 208/139, 138; 502/213, 502/214

[56] References Cited

U.S. PATENT DOCUMENTS 4,740,650  4/1988  Pellet et al. ................... 585/480
4,741,820  5/1988  Coughlin et al. ............... 208/139

*Primary Examiner*—Helane Myers
*Attorney, Agent, or Firm*—Thomas K. McBride; John F. Spears, Jr.; Richard E. Conser

[57] ABSTRACT

Reforming and dehydrocyclization catalysts and processes are disclosed wherein reforming catalysts comprise a Group VIII metal and at least one medium pore non-zeolitic molecular sieve characterized in the calcined form by an adsorption of isobutane of at least 2 percent by weight at a partial pressure of 500 torr and a temperature of 20° C. and characterized by an adsorption of triethylamine less than about 5 percent by weight at a partial pressure of 2.6 torr and a temperature of 22° C. In one embodiment the catalyst includes a Group VII metal on a halogenated carrier.

14 Claims, 6 Drawing Sheets

REFORMING/DEHYDROCYCLIZATION CATALYSTS

CROSS REFERENCE TO RELATED APPLICATIONS

This application is a continuation-in-part of prior copending application Ser. No. 625,273 now U.S. Pat. No. 5,098,877, which is a continuation-in-part of Ser. No. 447,340, abandoned, which is a continuation of Ser. No. 157,977, abandoned, which is a division of Ser. No. 844,951, now U.S. Pat. No. 4,741,820.

FIELD OF THE INVENTION

The instant invention relates to reforming and dehydrocyclization catalysts and to processes employing such catalysts. The catalysts contain novel non-zeolitic molecular sieves, as hereinafter described.

BACKGROUND OF THE INVENTION

Reforming is a process generally known to the petroleum industry as a process for the treatment of naphtha fractions of petroleum distillates to improve their octane rating by producing aromatic components from components present in the naphtha feedstock. Reforming is a complex process and involves a number of competing processes or reaction sequences. These include dehydrogenation of cyclohexanes to aromatics, dehydroisomerization of alkylcyclopentanes to aromatics, dehydrocyclization of an acyclic hydrocarbon to aromatics, and hydrocracking of paraffins to light products boiling outside the gasoline range. In addition, the dealkylation of alkylbenzenes and the isomerization of paraffins occur in reforming processes. Some of the reactions occurring during reforming are not desirable owing to their deleterious effect on the yield of commercially valuable products or upon the octane of the products. For example, hydrocracking reactions produce light paraffin gases, e.g., $C_1$-$C_4$, and reduce the yield of products boiling in the gasoline range.

The interest in catalytic reforming processes is fueled by a desire to improve the production (yield) of the gasoline fraction while concurrently increasing its octane, while also having sufficient catalytic activity to minimize the use of excessive temperature conditions for the dehydrocyclization process.

Several catalysts have been generally employed for catalytic reforming. Catalysts comprising platinum on chlorinated-alumina supports and Pt-X on alumina or chlorinated-alumina supports, where X is rhenium, iridium or tin, have been used for reforming naphthas. U.S. Pat. No. 4,370,224 discloses a multimetallic reforming catalyst comprised of platinum, iridium, copper, selenium and halogen, composited with an inorganic oxide support or carrier, preferably alumina. In addition, several patents have been issued for catalysts and/or processes employing zeolite-containing reforming catalysts. For example, several patents have disclosed the use of the zeolite mordenite in reforming catalysts, e.g., see U.S. Pat. Nos. 3,546,102; 3,679,575; 4,018,711 and 3,574,092. In addition, the use of ZSM-type zeolites in reforming catalysts and/or processes have been disclosed in U.S. Pat. Nos. 4,104,320; 4,417,083; 4,434,311 and 4,347,394. Further, the use of various forms of zeolite L is disclosed in U.S. Pat. Nos. 4,104,320, 4,447,316, 4,347,394 and 4,434,311. U.S. Pat. No. 4,417,083 discloses a process for the production of aromatic hydrocarbons in the presence of a two-bed process configuration employing a catalyst containing from 0.1 to 1.5% by weight of at least one metal selected from the group consisting of platinum, rhenium, iridium, tin and germanium, and containing sulfur in an atomic sulfur/metals ratio of from 0 to less than 1, supported on a crystalline, zeolitic aluminosilicate compensated by alkali metal cations, having a pore dimension larger than 6.5 Angstroms. The zeolite component is employed as a carrier. Among the zeolites that can be used are the Faujasites X and Y, the zeolite L and the zeolite omega.

Several chemical reactions occur during reforming. The most difficult of the desired reactions in reforming is the dehydrocyclization of paraffins and may be employed to evaluate a catalyst for its usefulness in reforming. The dehydrocyclization of paraffins containing six carbon atoms is one reaction carried out in reforming and is known to be relatively difficult. The ease of paraffin dehydrocyclization is known to generally increase with the number of carbon atoms present in the paraffin. Accordingly, an acidic reforming catalyst useful in forming aromatics from $C_6$ paraffins would also be considered to be equal or more effective in the conversion of paraffins containing seven or more carbon atoms. This conversion of acyclic hydrocarbons to cyclized and dehydrogenated aromatic products produces valuable aromatic products having higher octane value than the paraffins from which they were formed. Thus, the octane of the gasoline fraction increases as a result of both the decrease in paraffins and as a result of the increase in the higher octane value aromatic products with minimum yield loss as compared with simple paraffin cracking.

Although the prior art catalysts for reforming and dehydrocyclization have included the use of Group VIII metals with chlorinated-alumina and, in some instances, selected zeolite materials, the prior art has generally not disclosed the use of molecular sieves as components with noble metal/chlorinated-alumina catalysts and has not disclosed the use of non-zeolitic molecular sieves as components in reforming/dehydrocyclization catalysts.

U.S. Pat. No. 4,440,871 discloses a class of crystalline silicoaluminophosphates denominated as "SAPOs". The SAPOs of U.S. Pat. No. 4,440,871 are disclosed to be useful for hydrocarbon conversion reactions, including reforming and dehydrocyclization. The discussion of the use of SAPOs in reforming is set forth at column 70, lines 39 to 46 and reads as follows:

"The SAPO catalyst compositions employed in hydrocracking are also suitable for use in reforming processes in which the hydrocarbon feedstocks contact the catalyst at temperatures of from about 700° F. to 1,000° F., hydrogen pressures of from 100 to 500 psig, LHSV values in the range of 0.1 to 10 and hydrogen to hydrocarbon molar ratios in the range of 1 to 20, preferably between 4 and 12."

The discussion of the use of SAPOs in dehydrocyclization is set forth at column 71, lines 25 to 32, and reads as follows:

"Dehydrocyclization reactions employing paraffinic hydrocarbon feedstocks, preferably normal paraffins having more than 6 carbon atoms, to form benzene, xylenes, toluene and the like are carried out using essentially the same reaction conditions as for catalyst cracking. For these reactions it is preferred to use the SAPO catalyst in conjunction with a Group VII non-noble metal cation such as cobalt and nickel."

The above disclosures generally refer to the use of the class of SAPOs of U.S. Pat. No. 4,440,871 as catalysts for reforming and dehydrocyclization. This general disclosure is supported by evaluation of representative SAPO samples for their first-order rate constant. The first-order rate constant ($k_A$) is derived from a n-butane cracking experiment described at column 72, line 63 to column 73, line 30. The values for the first-order rate constants for SAPOs are set forth at column 73, lines 21 to 30. SAPO-5 is reported to have a $k_A$ of 1.4 and 7.4 for two preparative examples, SAPO-11 is reported to have a $k_A$ of 0.5 and SAPO-31 is reported to have a $k_A$ of 0.2. The meaning of the relative values of the first-order rate constants and their relationship to hydrocarbon conversion processes is not discussed. Further, U.S. Pat. No. 4,440,871 does not discuss the selection of SAPOs for the hydrocarbon conversion processes.

The instant invention relates to novel reforming and dehydrocyclization catalysts and processes wherein the catalyst is formulated using selected non-zeolitic molecular sieves, e.g., such as the silicoaluminophosphates disclosed in U.S. Pat. No. 4,440,871, as components in reforming catalysts.

DESCRIPTION OF THE INVENTION

Figure 1:
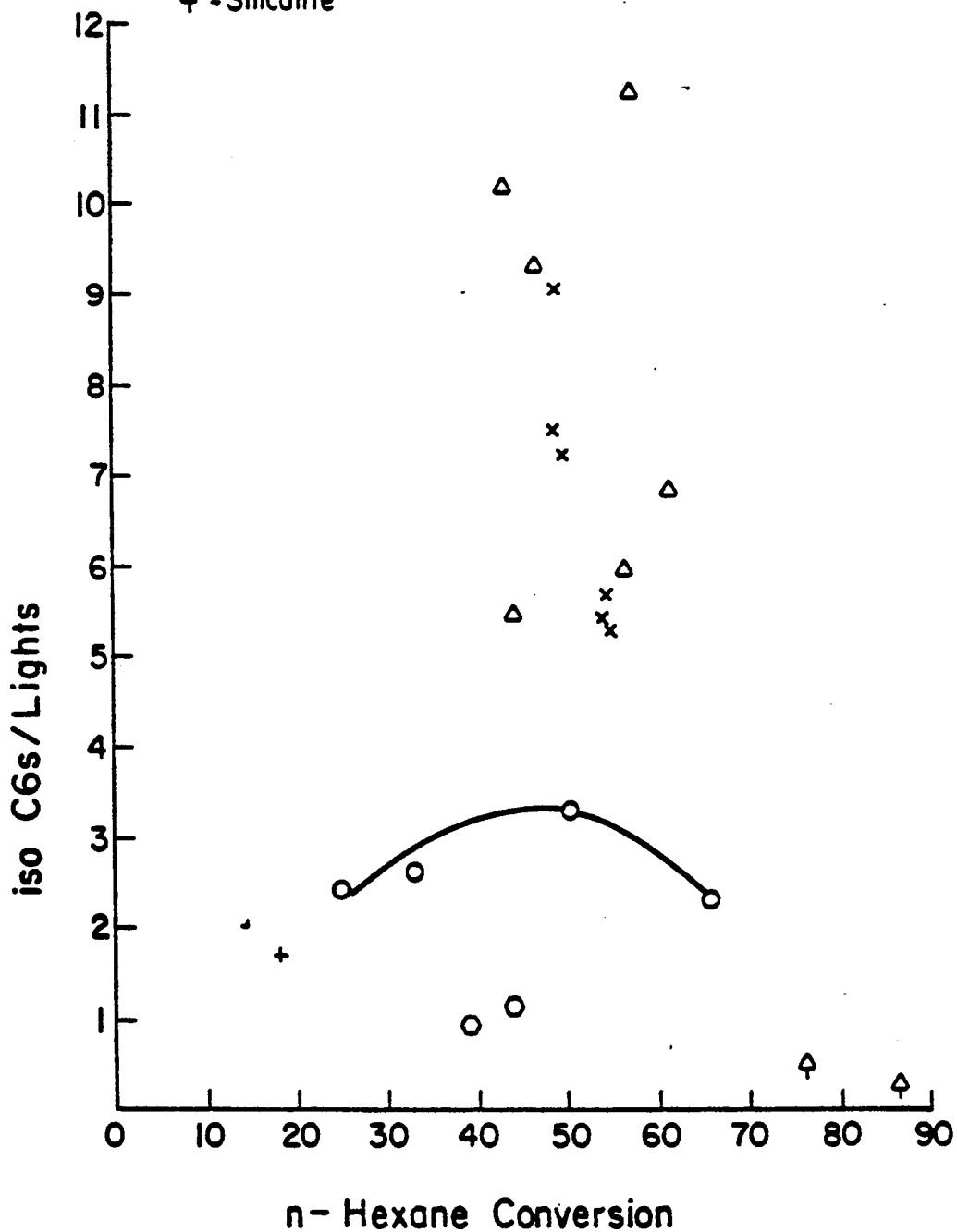
FIG. 1 depicts the relationship between the ratio of iso-$C_6$s/lights in the products as a function of the n-hexane conversion for examples 2 to 10.

The instant invention relates to reforming and dehydrocyclization catalysts and processes employing such catalysts. The term "medium pore" or the prefix "MP-" as employed in the instant invention refers to members of the class of non-zeolitic molecular sieves ("NZMS") which are characterized in their calcined form by an adsorption of isobutane of at least 2 percent by weight, preferably at least 4 percent by weight, at a partial pressure of 500 torr and a temperature of 20° C. and are also characterized in their calcined form by an adsorption of triethylamine less than about 5 percent by weight at a partial pressure of 2.6 torr and a temperature of 22° C., preferably less than 3 percent by weight. These "medium pore non-zeolitic molecular sieves" are referred to herein as "MP-NZMS" to reference the class or individually by the prefix "MP-" followed by the particular class member. For example "MP-SAPO" refers to a medium pore silicoaluminophosphate.

NON-ZEOLITIC MOLECULAR SIEVES ("NZMS")

The term "non-zeolitic molecular sieves" or "NZMS" is defined in the instant invention to include molecular sieves containing framework tetrahedral units ($TO_2$) of aluminum ($AlO_2$), phosphorus ($PO_2$) and at least one additional element (EL) as a framework tetrahedral unit ($ELO_2$). "NZMS" includes the silicoaluminophosphate molecular sieves of U.S. Pat. No. 4,440,871, "ELAPSO" molecular sieves as disclosed in U.S. Pat. No. 4,793,984 and certain "MeAPO", "FAPO", "TAPO" and "ELAPO" molecular sieves, as hereinafter described. Crystalline metal aluminophosphates (MeAPOs where "Me" is at least one Mg, Mn, Co and Zn) are disclosed in U.S. Pat. No. 4,567,029, crystalline ferroaluminophosphates (FAPOs) are disclosed in U.S. Pat. No. 4,554,143, titanium aluminophosphates (TAPOs) are disclosed in U.S. Pat. No. 4,500,651, metal aluminophosphates wherein the metal is As, Be, B, Cr, Ga, Ge, Li or V are disclosed in U.S. Pat. No. 4,686,093, and binary metal aluminophosphates are described in Canadian Patent 1,241,943. ELAPSO molecular sieves also are disclosed in patents drawn to species thereof, including but not limited to:

| NZMS | U.S. Pat. No. |
|---|---|
| AsAPSO | 4,894,213 |
| BeAPSO | 4,737,353 |
| CoAPSO | 4,744,970 |
| CrAPSO | 4,738,837 |
| FeAPSO | 4,683,217 |
| GaAPSO | 4,735,806 |
| MgAPSO | 4,882,038 |
| MnAPSO | 4,793,833 |
| ZnAPSO | 4,935,216 |
| TiAPSO | 4,801,309 |
| TiAPSO | 4,880,520 | as well as the metal alumino-phospho-silicate molecular sieves of U.S. Pat. No. 4,793,984 and the binary metal alumino-phospho-silicate sieves of U.S. Pat. No. 4,741,892.

The aforementioned patents are incorporated herein by reference thereto. The nomenclature employed herein to refer to the members of the aforementioned NZMSs is consistent with that employed in the aforementioned applications or patents. A particular member of a class is generally referred to as a "−n" species wherein "n" is an integer, e.g., SAPO-11, MeAPO-11 and ELAPSO-31. In the following discussion on NZMSs set forth hereinafter the mole fraction of the NZMS are defined as compositional values which are plotted in phase diagrams in each of the identified patents, published applications or copending applications.

The preferred NZMSs are the silicoaluminophosphate molecular sieves described in U.S. Pat. No. 4,440,871. the silicoaluminophosphate molecular sieves are disclosed as microporous crystalline silicoaluminophosphates, having a three-dimensional microporous framework structure of $PO_2^+$, $AlO_2^-$ and $SiO_2$ tetrahedral units, and whose essential empirical chemical composition on an anhydrous basis is:

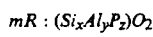

$$mR : (Si_xAl_yP_z)O_2$$

wherein "R" represents at least one organic present in the intracrystalline pore system; "m" represents the moles of "R" present per mole of $(Si_xAl_yP_z)O_2$ and has a value of from 0.02 to 0.3; "x", "y" and "z" represent, respectively, the mole fractions of silicon, aluminum and phosphorus present in the oxide moiety, said mole fractions being within the compositional area bounded by points A, B, C, D and E on the ternary diagram which is FIG. 1 of U.S. Pat. No. 4,440,871, and represent the following values for "x", "y" and "z":

| Point | Mole Fraction | | |
|---|---|---|---|
| | x | y | z |
| A | 0.01 | 0.47 | 0.52 |
| B | 0.94 | 0.01 | 0.05 |
| C | 0.98 | 0.01 | 0.01 |
| D | 0.39 | 0.60 | 0.01 |
| E | 0.01 | 0.60 | 0.39 |

The silicoaluminophosphates of U.S. Pat. No. 4,440,871 are generally referred to therein as "SAPO" as a class, or as "SAPO-n" wherein "n" is an integer denoting a particular SAPO such as SAPO-11, SAPO-31, SAPO-40 and SAPO-41. The especially preferred species SAPO-11 as referred to herein is a silicoaluminophosphate having a characteristic X-ray powder diffraction pattern which contains at least the d-spacings set forth below:

| SAPO-11 | | |
|---|---|---|
| 2r | d | Relative Intensity |
| 9.4–9.65 | 9.41–9.17 | m |
| 20.3–20.6 | 4.37–4.31 | m |
| 21.0–21.3 | 4.23–4.17 | vs |
| 21.1–22.35 | 4.02–3.99 | m |
| 22.5–22.9 (doublet) | 3.95–3.92 | m |
| 23.15–23.35 | 3.84–3.81 | m–s |

Ferroaluminophosphates are disclosed in U.S. Pat. No. 4,554,143, incorporated herein by reference, and have a three-dimensional microporous crystal framework structure of $AlO_2$, $FeO_2$, and $PO_2$ tetrahedral units and have an essential empirical chemical composition, on an anhydrous basis, of:

$$mR : (Fe_xAl_yP_z)O_2$$

wherein "R" represents at least one organic templating agent present in the intracrystalline pore system; "m" represents the moles of "R" present per mole of $(Fe_xAl_yP_z)O_2$ and has a value of from zero to 0.3, the maximum value in each case depending upon the molecular dimensions of the templating agent and the available void volume of the pore system of the particular ferroaluminophosphate involved; "x", "y", and "z" represent the mole fractions of iron, aluminum and phosphorus, respectively, present as tetrahedral oxides, representing the following values for "x", "y", and "z":

| Point | Mole Fraction | | |
|---|---|---|---|
| | x | y | z |
| A | 0.01 | 0.60 | 0.39 |
| B | 0.01 | 0.39 | 0.60 |
| C | 0.35 | 0.05 | 0.60 |
| D | 0.35 | 0.60 | 0.05 |

When synthesized the minimum value of "m" in the formula above is 0.02. The iron of the $FeO_2$ structural units can be in either the ferric or ferrous valence state, depending largely upon the source of the iron in the synthesis gel. Thus, an $FeO_2$ tetrahedron in the structure can have a net charge of either $-1$ or $-2$. While it is believed that the Fe, Al and P framework constituents are present in tetrahedral coordination with oxygen (and are referred to herein as such), it is theoretically possible that some minor fraction of these framework constituents are present in coordination with five or six oxygen atoms. It is not, moreover, necessarily the case that all of the Fe, Al and/or P content of any given synthesized product is a part of the framework in the aforesaid types of coordination with oxygen. Some of each constituent may be merely occluded or in some as yet undetermined form, and may or may not be structurally significant.

For convenience in describing the ferroaluminophosphates, the "short-hand" acronym "FAPO" is sometimes employed hereinafter. To identify the various structural species which make up the generic class FAPO, each species is assigned a number and is identified, for example, as FAPO-11, FAPO-31 and so forth.

MeAPO molecular sieves are crystalline microporous aluminophosphates in which the substituent metal is one of a mixture of two or more divalent metals of the group magnesium, manganese, zinc and cobalt and are disclosed in U.S. Pat. No. 4,567,029. Members of this novel class of compositions have a three-dimensional microporous crystal framework structure of $MO^{-1}{}_2$, $AlO^-{}_2$ and $PO_2{}^+$ tetrahedral units and have an essential empirical chemical composition, on an anhydrous basis, of:

$$mR : (M_xAl_yP_z)O_2$$

wherein "R" represents at least one organic templating agent present in the intracrystalline pore system; "m" represents the moles of "R" present per mole of $(M_xAl_yP_z)O_2$ and has a value of from zero to 0.3, the maximum value in each case depending upon the molecular dimensions of the templating agent and the available void volume of the pore system of the particular metal aluminophosphate involved; "x", "y", and "z" represent the mole fractions of the metal "M", (i.e., magnesium, manganese, zinc and cobalt), aluminum and phosphorus, respectively, present as tetrahedral oxides, said mole fractions being such that they are within the following limiting values for "x", "y", and "z":

| Point | Mole Fraction | | |
|---|---|---|---|
| | x | y | z |
| A | 0.01 | 0.60 | 0.39 |
| B | 0.01 | 0.39 | 0.60 |
| C | 0.35 | 0.05 | 0.60 |
| D | 0.35 | 0.60 | 0.05 |

When synthesized the minimum value of "m" in the formula above is 0.02.

The CoAPSO molecular sieves of U.S. Pat. No. 4,744,970 have three-dimensional microporous framework structures of $CoO_2{}^{-2}$, $AlO_2{}^-$, $PO_2{}^+$ and $SiO_2$ tetrahedral units and have an empirical chemical composition on an anhydrous basis expressed by the formula:

$$mR : (Co_wAl_xP_ySi_z)O_2$$

wherein "R" represents at least one organic templating agent present in the intracrystalline pore system; "m" represents the molar amount of "R" present per mole of $(Co_wAl_xP_ySi_z)O_2$ and has a value of from zero to about 0.3; and "w", "x", "y" and "z" represent the mole fractions of cobalt, aluminum, phosphorus and silicon, respectively, present as tetrahedral oxides, where the mole fractions "w", "x", "y" and "z" are each at least 0.01 and are generally defined, as being within the limiting compositional values or points as follows:

| Point | Mole Fraction | | |
|---|---|---|---|
| | x | y | (z + w) |
| A | 0.60 | 0.38 | 0.02 |
| B | 0.38 | 0.60 | 0.02 |
| C | 0.01 | 0.60 | 0.39 |
| D | 0.01 | 0.01 | 0.98 |
| E | 0.60 | 0.01 | 0.39 |

It is within the scope of the invention that the catalyst comprises two or more NZMSs. Preferably the NZMSs are as a multi-compositional, multi-phase composite having contiguous phases, a common crystal framework structure and exhibiting a distinct heterogeneity in composition, especially wherein one phase comprises a deposition substrate upon which another phase is deposited as an outer layer. Such composites are described in U.S. Pat. No. 4,861,739, incorporated herein by reference thereto. In a highly preferred embodiment the layered catalyst comprises a crystalline aluminophosphate of U.S. Pat. No. 4,310,440 and a SAPO, especially ALPO-11 and SAPO-11.

MP-NZMS MOLECULAR SIEVES

The specific NZMSs employed in the instant invention are members of the classes described hereinabove and are characterized in their calcined form by an adsorption of isobutane of at least 2 percent by weight, preferably at least 4 percent by weight, at a partial pressure of 500 torr and a temperature of 20° C. and, further, by an adsorption of triethylamine of less than 5 percent by weight, preferably less than 3 percent by weight, at a partial pressure of 2.6 torr and at a temperature of 22° C.

The adsorption characteristics relate to the pore size or dimension, or crystallographic free diameter as described in the Atlas of Zeolite *Structure Types*, 1987 Edition issued by the Structure Commission of the International Zeolite Association. Recognizing that the effective free diameter may depend to some extent on such factors as hydration state and temperature, the maximum pore dimension of medium-pore NZMSs employed in the instant invention generally will be no more than about 7 Å and more usually about 6.5 Å or less. For convenient reference the medium-pore NZMSs which are characterized by the aforementioned adsorption criteria are denominated herein as "MP-NZMS" or as a class as "MP-NZMSs".

As aforementioned, the MP-NZMSs employed herein are characterized by the aforementioned adsorption criteria for isobutane and triethylamine. Specific MP-NZMS species which may be employed herein include MP-NZMSs in one or more of the aforementioned subclasses and having a "-n" designation of -11, -31, -40, and -41. MP-NZMSs include, but are not limited to, ELAPSO-11, ELAPSO-31, ELAPSO-40, ELAPSO-41, CoAPSO-11, CoAPSO-31, FeAPSO-11, FeAPSO-31, MgAPSO-11, MgAPSO-31, MnAPSO-11, MnAPSO-31, TiAPSO-11, ZnAPSO-11, ZnAPSO-31, CoMgAPSO-11, CoMnMgAPSO-11, MeAPO-11, TiAPO-11, TiAPO-31, ELAPO-11, ELAPO-31, ELAPO-40, ELAPO-41 SAPO-11, SAPO-31, SAPO-40 and SAPO-41.

The characterization of the NZMSs employed in the instant invention relates to an adsorption characterization that is carried out on a NZMS which has been subjected to a post synthesis treatment, e.g., calcination, to remove a substantial portion of the template "R" which is present as a result of synthesis. Although a particular MP-NZMS is characterized herein by reference to its adsorption of isobutane or triethylamine as being to the adsorption characteristics of the MP-NZMS in its calcined form, the instant invention necessarily includes the use of a non-calcined or modified MP-NZMSs which are characterized by such adsorption in a modified or calcined form, since upon use of such a non-calcined MP-NZMS in the instant process at effective reforming conditions the NZMS may be calcined or hydrothermally treated in situ so as to have the characteristic adsorptions of isobutane and triethylamine. Thus, the NZMS may be rendered in situ to a form characterized by the aforementioned adsorption characteristics and, accordingly, such is within the scope of the instant invention. For example, an as-synthesized MnAPO-11 or MgAPSO-11 is not characterized by the aforementioned adsorption characteristics due to the presence of template "R" which is present as a result of synthesis, although the calcined form of MnAPO-11 and MgAPSO-11 are characterized by the aforementioned adsorption of isobutane and triethylamine. Thus, reference to a MP-NZMS having a particular adsorption characteristic in its calcined form is not intended to exclude the use of the MP-NZMS in its as-synthesized form which upon in-situ calcination, hydrothermal treatment and/or other treatment, e.g., ion exchange with suitable atoms, would have such adsorption characteristics.

MP-NZMS-CONTAINING CATALYSTS

The MP-NZMS may be employed in conjunction with a Group VIII metal as a reforming/dehydrocyclization catalyst or may be employed in conjunction with a metal/chlorinated-alumina catalyst(s) as generally employed heretofore as reforming catalysts. In one embodiment a MP-NZMS is employed with a traditional reforming catalyst comprising a Group VIII metal and a chlorinated carrier, e.g., an alumina. The term "carrier" is employed herein in its common meaning to denote a support material for the metal component of the reforming catalyst. In this embodiment the Group VIII metal is generally present in an effective amount from about 0.1 to about 2, preferably from about 0.2 and about 1.2 percent by weight (wt. %), more preferably between about 0.2 and 0.8 wt. %, based on the weight of the carrier, with from about 0.1-2% by weight halogen, preferably chlorine being present, based on the weight of the carrier, e.g., an alumina. (reference to "chlorine" and/or "chlorinated" herein is intended to include the other halogens.) The MP-NZMS component may be present in an amount between about 1 and about 99.9 percent by weight (wt. %), is preferably present in an amount between about 5 and about 70 wt. % and more preferably between about 5 and 40 wt. %, based on the total weight of the catalyst. When a halogenated carrier component is present such as may be present in an effective amount between about 5 and about 95 percent by weight and is preferably present in an effective amount of at least 40 percent by weight, based on the total catalyst weight.

The MP-NZMS-containing catalysts contain an effective amount of one or more Group VIII metals, e.g., nickel, ruthenium, rhodium, palladium, iridium or platinum. In one embodiment the MP-NZMS is employed in a catalyst comprising a first Group VIII metal in conjunction with a second metal component to form a bi-metallic catalyst and, optionally, may also be used with the aforementioned chlorinated-alumina component. The catalyst may contain as the second metal component a second Group VIII metal, a transition metals such as rhenium, tungsten, and/or a metal such as tin.

The preferred Group VIII metal for use herein is platinum. Platinum-containing catalysts generally exhibit high selectivity to high octane products. The percentage of platinum in the catalyst is generally between about 0.1 wt. % and about 2 wt. % and preferably between about 0.2 and about 1.2 wt. %, and most preferably between about 0.2 to 0.8, based on the total catalyst weight. In the prior art it has been observed that the lower limit corresponds to a lower catalyst activity and the upper limit to higher catalyst activity. When a second metal component is employed, the weight ratio of the Group VIII metal, e.g. platinum, to such second metal, including a second Group VIII metal or rhenium, is between about 1:5 and about 5:1 and is preferably between about 1:2 and about 2:1. The total amount of the metal components will be in the aforementioned ranges.

The metal component(s) of the MP-NZMS-containing catalyst is generally introduced by means of impregnation using an aqueous solution of an appropriate salt of the desired metal(s). When it is desired to introduce two metal components, the operation may be carried out simultaneously or sequentially. The addition of the metal component(s) to the instant reforming catalyst depends in part on the formulation of the reforming catalyst. If it is desired that the MP-NZMS be employed as the carrier for the metal component, it is believed that the metal component should be added to the MP-NZMS before the MP-NZMS is calcined to remove the organic templating agent present as a result of the MP-NZMS synthesis. It is believed that the addition of the metal to the template-containing MP-NZMS affects the distribution of the metal in a favorable way by preventing the metal species from blocking the pores of the MP-NZMS and affecting the activity of the MP-NZMS. It is believed that when the metal component is added to the MP-NZMS, acting as the carrier for the metal component, as a cationic species, that it is preferred to add such cationic metal component prior to calcination of the MP-NZMS whereby organic templating agent is removed, such being present as a result of the synthesis of the MP-NZMS. This procedure is believed to aid in preventing blockage of the pores of the MP-NZMS by cationic metal species. It is believed that the calcined form of the MP-NZMSs may be employed as the carrier for the metal component when anionic metal species are employed as the source of the metal component. When the metal component of the catalyst is added by addition to a separate carrier component, such as an alumina (including transition aluminas and gamma aluminas), to form a discrete component, the metal/carrier component is admixed with the MP-NZMS. The mixture may then be mixed with a binder, e.g., a silica, if any, and formed, e.g., by coextrusion, into the final catalyst. In another embodiment, an as-synthesized MP-NZMS (containing template) and a carrier may be mixed prior to the impregnation or other introduction of the metal component. The template can then be removed by calcination under conditions effective for the removal of the organic templating agent from the MP-NZMS.

By way of example, platinum can be introduced to the catalyst by impregnating (or other suitable addition process) a carrier, e.g., a gamma-alumina, or a MP-NZMS, e.g., SAPO-11, with an aqueous solution of tetrammineplatinum (II) nitrate, chloroplatinic acid, chloroplatinuous acid, dinitrodiamino-platinum, tetrammineplatinum (II) chloride, anionic platinum complexes or cationic platinum complexes (such as tetrammineplatinum (II) nitrate). Similar compounds of the other metal components may be employed. The use of a halogen containing (e.g., chlorine) salt or complex of platinum is generally beneficial in providing halogen (e.g., chloride or chloro-species) component, if any is desired, in the final catalyst.

An inorganic oxide is generally employed as a carrier for the metal component. In addition, an inorganic oxide may be employed, as an optional component, as a binder component for the final catalyst. The inorganic oxides employable as a carrier for the metal and/or as a matrix component and/or as a binder component can be a natural or synthetically produced inorganic oxide or combination of inorganic oxides. Typical inorganic oxides which can be used include clays, aluminas (preferably transition- and gamma-alumina), silicas, silica-aluminas, titanias, magnesia, alumina-boria, alumina-titania, and mixtures thereof. The preferred inorganic oxide carrier for the metal component(s) is believed to be an alumina, and more preferably a gamma-alumina. The preferred binder components are believed to be aluminas and silicas. The inorganic oxide component present as a binder or matrix component may be present in an amount from zero (0) to about 25 weight percent, based on the total catalyst weight, said amount not including any inorganic oxide present as a carrier for the metal component.

In one embodiment, a MP-NZMS is preferably added to the metal/chlorinated carrier component as a separate component. As discussed above, it is believed that the preparation uses a cationic metal species to provide the metal component to a carrier separate from calcined MP-NZMS that such may prevent possible deactivation of the calcined MP-NZMS by the use of such cationic metal species to provide the metal component in the catalyst containing a calcined MP-NZMS.

The MP-NZMS-containing catalysts can be employed in any of the conventional catalyst forms known to the art for reforming and/or dehydrocyclization catalysts, including pills, pellets, granules, broken fragments, or various special shapes. The catalysts can be employed in heretofore employed bed configurations including a fixed bed within a reaction zone, and the charging stock may be passed therethrough in the liquid, vapor (preferably the vapor phase), or mixed phase in either upward or downward flow. Alternatively, the catalyst may be prepared in a suitable form for use in moving beds, or in fluidized-solid processes, in which the charging stock is passed upward through a turbulent bed of finely divided catalyst. The instant catalyst(s) may be used in semi-regenerative, cyclic, semicyclic, or continuous reforming processes. Such processes are well known. The reaction products from any of the foregoing processes are charged to a separator for removal of light gases, and fractionated to recover the various components thereof.

In one embodiment the MP-NZMS-containing catalyst(s) of the instant invention may be employed in a tail reactor as the last catalyst bed in a process employing multiple catalyst beds. The first catalyst in such an embodiment would comprise a traditional reforming and/or dehydrocyclization catalyst and would generally be the same catalyst as employed in the instant process, except such would not contain the MP-SAPO component.

After the desired metal(s) has been introduced, the catalyst is typically treated in air at about 400° to 600° C., preferably about 500° C. 50° C., and then reduced in the presence of a hydrogen-containing gas at temperatures of between about 200° C. and about 700° C., preferably between about 350° C. and about 500° C.

In some instances the selectivity of a MP-NZMS-containing catalyst may benefit from an initial deactivation by steaming, coking or by treatment with sulfur compounds. Such deactivation methods are well known in the art to provide improved selectivity by decreasing the initial activity of the catalyst.

FEEDSTOCKS

The feedstock in reforming is typically a mixed hydrocarbon fraction containing significant quantities of paraffinic hydrocarbons, commonly available in a typical refinery. Suitable feedstocks include, naphthas (virgin, cracked or Fischer-Tropsch), highly paraffinic straight-run naphthas, paraffinic raffinates from aromatic extraction or adsorption, upstream reformate feedstocks, heavy hydrocracked gasoline fractions, $C_6$–$C_9$ paraffin-rich streams and the like refinery streams. In the case of cracked naphthas, the naphtha is generally hydrogenated prior to use to reduce the presence of olefinic compounds. In a typical reforming operation the feedstock is a naphtha or petroleum fraction boiling in the range of between about 80° F. and about 450° F., and preferably between about 180° F. and about 380° F. Such fractions usually contain from about 20 to about 80 volume % paraffins, both normal and branched, which fall in the range of about $C_5$ to $C_{12}$ In one embodiment, the feedstock contains paraffinic hydrocarbons having about 6 to 12 carbon atoms per molecule. It is to be understood that such acyclic hydrocarbons can be charged individually, in admixture with one or more of the other acyclic hydrocarbons, or in admixture or as components of other hydrocarbon mixtures such as naphthenes, aromatics and the like.

Feedstocks comprising essentially acyclic hydrocarbons may be employed herein if dehydrocyclization is the desired reaction and can in general be any acyclic hydrocarbon capable of undergoing ring-closure to produce an aromatic hydrocarbon. That is, it is intended to include within the scope of the present invention, the dehydrocyclization of any acyclic hydrocarbon capable of undergoing ring-closure to produce an aromatic hydrocarbon under effective process conditions for reforming and/or dehydrocyclization. More particularly, suitable acyclic hydrocarbons include acyclic hydrocarbons containing 6 or more carbon atoms per molecule such as $C_6$–$C_{12}$ paraffins. Specific examples of suitable acyclic hydrocarbons are paraffins such as n-hexane, 2-methylpentane, 3-methylpentane, n-heptane, 2-methylhexane, 3-methylhexane, 3-ethyl-pentane, 2,5-dimethylhexane, n-octane, 2-methylheptane, 3-methylheptane, 4-methylheptane, 3-ethylhexane, n-nonane, 2-methyloctane, 3-methyloctane, n-decane and the like compounds.

Preferably, the feedstocks employed in reforming are substantially free of sulfur, nitrogen, metals, and other known poisons for reforming catalysts. The feedstock can have sulfur, nitrogen, metals, and other known poisons removed by conventional hydrotreating techniques plus sorbers that remove such compounds.

In the case of a feedstock which is not already low in sulfur, acceptable sulfur levels can be obtained by hydrofining the feedstock in a pretreatment zone where the naphtha is contacted with a hydrofining catalyst which is resistant to sulfur poisoning. A suitable catalyst for hydrodesulfurization is, for example, an alumina-containing support containing molybdenum oxide, cobalt oxide and/or nickel oxide. Hydrodesulfurization is ordinarily conducted at 315° C. to 455° C., at 200 to 2000 psig, and at a liquid hourly space velocity of 1 to 5. The sulfur and nitrogen contained in the naphtha are converted to hydrogen sulfide and ammonia, respectively, which can be removed prior to reforming by suitable conventional processes.

REFORMING PROCESSES

Reforming processes may be carried out over a wide range of effective reforming process conditions. The actual process conditions depend on the particular reforming catalyst, the feedstock, the desired products, the reforming process design and the like. Process conditions for Catalytic reforming, Magnaforming, Platforming, Powerforming, Rheniforming and Ultraforming are well known in the art (see: "Hydrocarbon Processing," September 1982, at pages 164, 165, 166, 167, 168 and 169, respectively; incorporated herein by reference). Magnaforming is described at pages 111 to 114 of "Hydrocarbon Processing," June 1974 (incorporated herein by reference). A description of a representative reforming process is disclosed in U.S. Pat. No. 4,018,771 at column 5, line 19 to column 6, line 50, said passage incorporated herein by reference.

The feedstock is contacted with the catalyst under effective reforming conditions as heretofore employed in the prior art. This contacting may be accomplished by using the catalyst in a fixed bed system, a moving bed system, a fluidized system, or in a batch-type operation. In a fixed bed system, the feedstock is preheated by any suitable heating means to the effective reforming process temperature and pressure and then passed into a reforming zone containing a bed of the catalyst. It is, of course, understood that the reforming process may be one or more separate reactors with suitable means therebetween to ensure that the desired conversion temperature is maintained at the entrance to each reactor. It is also important to note that the reforming feedstock may be contacted with the catalyst bed in either upward, downward, or radial flow fashion. In addition, the reactants may be in a liquid phase, a mixed liquid-vapor phase, or a vapor phase when they contact the catalyst. A reforming process typically comprises two or more fixed beds or dense-phase moving beds of the catalyst. In a multiple bed system, it is, of course, within the scope of the present invention to use the present catalyst in less than all of the beds with a conventional reforming catalyst being used in one or more upstream beds of the multi-bed system. The reforming zone may be one or more separate reactors with suitable heating means therebetween to compensate for the endothermic nature of the reforming process that takes place in each catalyst bed.

Reforming generally results in the production of hydrogen. Thus, exogenous hydrogen need not necessarily be added to the reforming system except for pre-reduction of the catalyst and when the feed is first introduced. Generally, once reforming is underway, part of the hydrogen produced is recirculated over the catalyst. The presence of hydrogen is generally understood in the art to reduce the formation of coke which tends to deactivate the catalyst. Hydrogen is preferably introduced into the reforming reactor(s) at a rate varying from greater than zero to about 30 moles of hydrogen per mole of feedstock. The hydrogen can be added in admixture with light gaseous hydrocarbons.

Although hydrogen may be used, in some cases other art-recognized diluents may be advantageously utilized, either individually or in admixture with hydrogen. Other diluents include $C_1$ to $C_5$ paraffins such as methane, ethane, propane, butane and pentane and mixtures thereof. If, after a period of operation, the reforming catalyst has become deactivated by the presence of carbonaceous deposits, said deposits can be removed from the catalyst by passing an oxygen-containing gas, such as dilute air. Chlorine and/or chloro-compounds (in the presence of an oxygen-containing gas) are generally brought into contact with the catalyst to aid in redistribution of metal components present in the catalyst, if necessary. Regeneration of the MP-NZMS-containing catalyst may be performed in the semi-regenerative mode in which the reforming operation is interrupted after a period of time and catalyst regeneration is carried out, or in the onstream regenerative mode, in which a portion of the catalyst is regenerated while the reforming operation is continued over the remainder of the catalyst. Two types of onstream regeneration are generally known in the prior art, cyclic and continuous (in situ regeneration). In cyclic reforming, the catalyst in one of a series of reactors is regenerated while reforming is continued in the remainder of the reactors. In continuous reforming, a portion of deactivated catalyst is removed from operation, regenerated in a separate regeneration system while reforming is continued, and the regenerated catalyst is then returned to the reforming operation. The method of regenerating the catalyst will depend on whether there is a fixed bed, moving bed, or fluidized bed operation and the particular process constraints of the refiner. Regeneration methods and conditions for reforming are well known in the art and such are generally employable with the instant MP-NZMS-containing catalysts.

In the following examples the products were evaluated in several respects by determining:

$$\text{Calculated Density of } C_5+ \text{ Product} = \frac{\text{Wt \% } C_5+}{\sum_{i}^{n} (\text{Wt. \%}_i/\text{Density}_i)}$$

where i a component and n is the number of components present in the products.

Calculated Volume % $C_5+$ Yield =

$$\frac{(\text{Wt. } C_5 \text{ Product})/(\text{Calculated } C_5+)\text{Density}}{(\text{Wt. Feed})/(\text{Feed Density})}$$

The Research Octane Number (RON) of the $C_5+$ product (products containing five or more carbons) was calculated using the published octane numbers for individual $C_5+$ components and from their volume percent in the $C_5+$ product. The volume % of individual $C_5+$ components was calculated as follows:

Vol % Component$_g$ =

$$\frac{(\text{Wt. \% Component}_g \text{ in } C_5+)/(\text{Density}_g)}{\sum_{i}^{n} (\text{Wt. \% Component}_i)/(\text{Density}_i)} \times 100$$

where "g" is a particular component in products and "i" represents all components summed over all "n" components in $C_5+$ products.

The calculated RON was determined for the $C_5+$ product according to:

$$\text{Calculated RON} = \sum_{i}^{n} \left( RON_i \times \frac{(\text{Volume \% Component})_i}{100} \right)$$

where $RON_i$ is the blending research octane numbers for component "i".

The following examples are provided to illustrate the invention and are not intended to be limiting thereof:

EXAMPLE 1 a) A reference catalyst (denominated "Reference Catalyst A") was prepared with a CATAPAL (pseudoboehmite) alumina (CATAPAL is a trademark of Condea Alumina SB), which was calcined in air at 200° C. for 4 hours and heated for 16 hours at 540° C. to form a gamma-alumina. A twenty four-gram sample of the gamma alumina was impregnated with a solution containing 0.48 grams of $H_2PtCl_2$ and 0.96 grams of $Al(NO3)_3$ in 8.4 grams of water. The alumina and the $H_2PtCl_2$ solution were mulled, dried at room temperature for one hour, remulled and then dried at 121° C. for 16 hours. The dried product (Pt/Cl-alumina component) was then calcined in air at 260° C. for two hours. The calcined product was formed into 1/16" extrudates by mixture with $SiO_2$ and the final extrudates contained 20 wt. % $SiO_2$ (LUDOX AS 40) binder. The $SiO_2$ was gelled prior to use with ammonium acetate (1 ml. of 6.7 wt. % ammonium acetate per gram of $SiO_2$). The extrudates were dried in air at 110° C. overnight for 16 hours and calcined in air at 540° C. for 3 hours. The extrudates were ground to form a 40-60 mesh (U.S. Standard). Reference Catalyst A contained the following amounts of platinum and chloride:

|    | Wt. % |
|----|-------|
| Pt | 0.63  |
| Cl | 0.25  | b) A catalyst according to the instant invention was prepared by preparing a mixture containing 60 wt. % of the Pt/Cl-alumina component, as prepared in part (a) in the preparation of Reference Catalyst A, and 40 wt. % of a SAPO-11, as disclosed in U.S. Pat. No. 4,440,871.

SAPO-11 was prepared according to example 17 of U.S. Pat. No. 4,440,871, except that the crystallization time was 24 hours instead of 48 hours. A reaction mixture was prepared by combining 23.06 grams of 85 wt. % orthophosphoric acid ($H_3PO_4$) and 23.06 grams of water, to which was added 13.81 grams of a hydrated aluminum oxide (a pseudoboehmite phase, 74.2 wt. % $Al_2O_3$, 25.8 wt. % $H_2O$) and stirred until homogeneous. To this mixture was added a mixture of 3.90 grams of a fumed silica (92.8 wt. % $SiO_2$, 7.2 wt. % $H_2O$) in 103.5 grams of a solution of 25.0 wt. % tetra-n-butylammonium hydroxide (TBAOH) in methanol. This mixture was stirred until homogeneous and then 20.41 grams of di-n-propylamine was added with stirring until a homogeneous mixture was obtained. The composition of the final reaction mixture in molar oxide ratios was:
2.0Pr$_2$NH : 0.5(TBA)$_2$O : Al$_2$O$_3$ : P$_2$O$_5$: 0.6SiO$_2$ : 16.75H$_2$O : 24.3CH$_3$OH
A portion of the reaction mixture was placed in a stainless steel pressure vessel lined with an inert plastic material and heated in an oven at 200° C. at autogenous pressure for 24 hours. The solid reaction product was recovered by centrifuging, washing with water, and was then dried in air at room temperature. A portion of the solids was submitted for X-ray and chemical analysis and gave an X-ray powder diffraction pattern representative of SAPO-11. By chemical analysis, the composition was found to be 31.5 wt. % $Al_2O_3$, 40.9 wt. % $P_2O_5$, 12.0 wt. % $SiO_2$, 8.1 wt. % C, 1.2 wt. % N, 13.9 wt. % LOI. The SAPO-11 product was then calcined at above 450° C. in air to remove the organic templating agent.

The SAPO-11 and Pt/Cl-alumina component were mixed with 20 wt. % $SiO_2$ binder, as discussed in part (a), and extruded. The extrudate was dried at 110° C. overnight (N16 hours) and calcined in air at 540° C. for 3 hours. This catalyst was denominated "Catalyst B".

c) A Comparative Catalyst (containing SAPO-5) was prepared according to the procedure employed in part (b), except SAPO-5 was employed in place of SAPO-11. SAPO-5 was prepared according to examples 9 and 11 of U.S. Pat. No. 4,440,871, except that the organic templating agent was tetrapropylammonium hydroxide, the gel $SiO_2/Al_2O_3$ ratio was 0.6 and the gel contained 40 $H_2O$. The reaction mixture was prepared by combining triethylphosphate and water, to which was added a pseudoboehmite alumina. The mixture was stirred until homogeneous. To this mixture was added a dispersion of a fumed silica (92.8 wt. % $SiO_2$, 7.2 wt. % $H_2O$ ), and an aqueous solution of 40% tetra-n-propylammonium hydroxide (TPAOH), and the mixture stirred until homogeneous. The composition of the final reaction mixture in molar oxide ratios was:
Al$_2$O$_3$ : P$_2$O$_5$ : 0.6SiO$_2$:(TPA)$_2$O: 40H$_2$O
A portion of the reaction mixture was sealed in a stainless steel pressure vessel lined with an inert plastic material and heated in an oven at 200° C. at autogenous pressure for 24 hours. The solid reaction product was recovered by centrifuging, washing with water and then dried in air at room temperature. The product was analyzed and gave an X-ray powder diffraction pattern characteristic of SAPO-5. The product was calcined at above 450° C. in air to remove organic templating agent. This catalyst was denominated "Catalyst C".

EXAMPLE 2

The catalysts prepared in example 1 were evaluated as dehydrocyclization catalysts using a technical grade n-hexane feedstock containing:

|  | Wt. % |
| --- | --- |
| n-hexane | 86.357 |
| methylcyclopentane | 9.694 |
| 3-methylpentane | 3.741 |
| 2-methylpentane | 0.207 |
| RON (Research Octane Number) | 29.27 |

The catalysts (A, B and C) were evaluated using a micro reactor comprising a stainless steel tube (⅛" (ID)) and using about 0.350 to 0.359 grams of the selected catalyst (40×60 mesh, U.S. Standard). The selected catalyst was heated to 900° F. over 2½ to 3 hours under $H_2$ (120 ml/min 100 psig) and held at 900° F. for one hour and cooled to 860° F. The $H_2$ was lowered to 75 ml./min. and the feed was then introduced into the micro reactor. The micro reactor was maintained at the process temperature by a fluidized sandbath.

Each catalyst was evaluated by preheating the micro reactor at a temperature of about 860° F. or at about 900° F.

The n-hexane feed was then introduced at a pressure of 100 psig, a Weight Hourly Space Velocity (WHSV) of 7.7 and a hydrogen/feed molar ratio of 5.4. Products were collected at selected run times and the products were analyzed by gas chromatrography. The weight percent products and other reported values were computed on the basis of a 100% material balance. The volume % was calculated using product densities and assuming no volume changes occurred upon mixing of product components. The RON of the feedstock and products was calculated using the calculated volume percents and the blending research octane numbers of the individual components.

Figure 2:
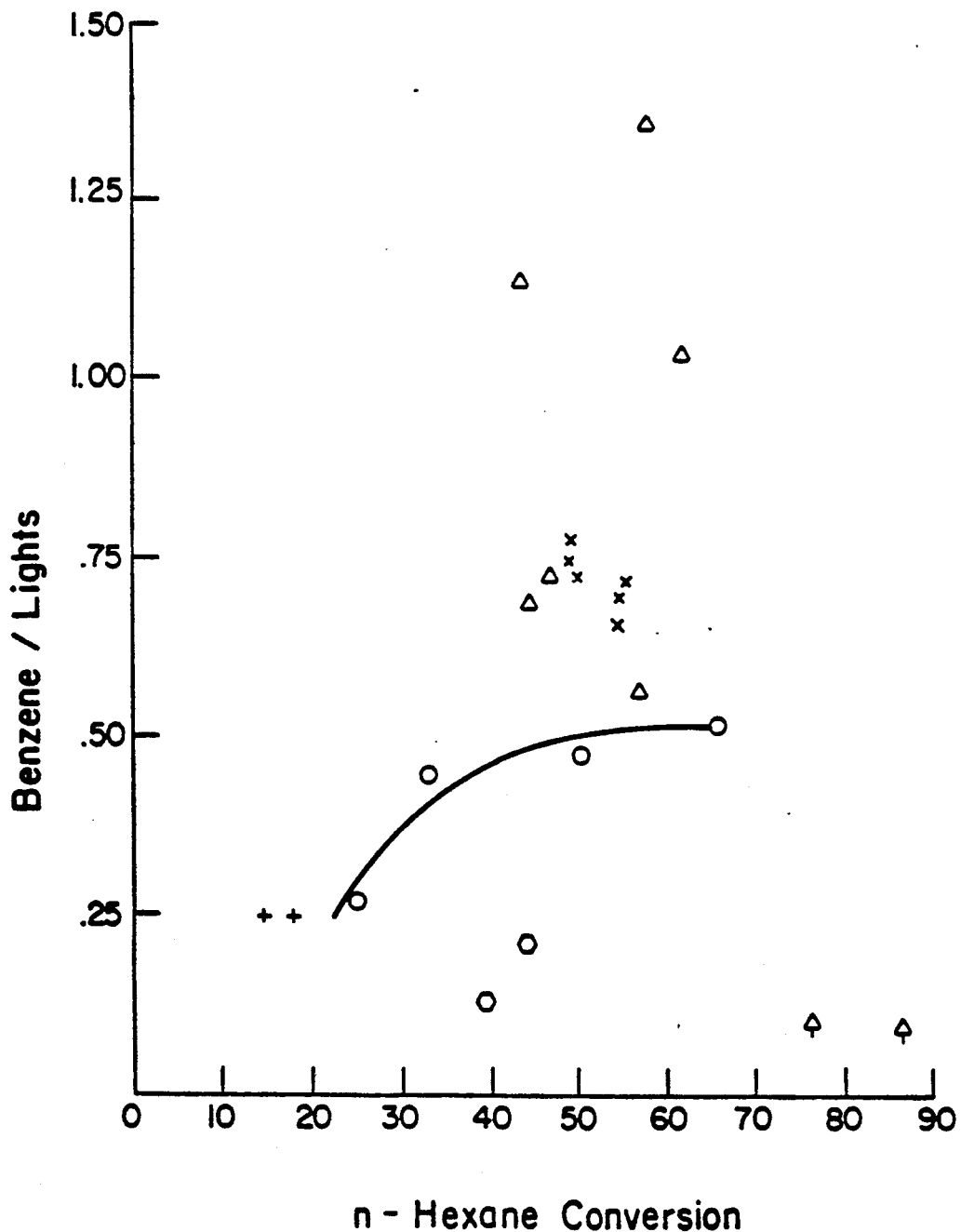
FIG. 2 depicts the relationship between the ratio of benzene/lights in the products as a function of the n-hexane conversion for examples 2 to 10.

The results of the evaluation of Catalysts A, B and C are set forth in Tables I, II and III for each catalyst, respectively, at temperatures of 860° F. (Tables I-1, II-1 and III-1) and 900° F. (Tables I-2, II-2 and III-2). The results, as set forth in Tables I, II and III, demonstrate the dramatic effect that SAPO-11 has in a reforming-/dehydrocyclization process when employed with a Pt/Cl-alumina-type catalyst. The SAPO-11 provides an improvement in the ratio of benzene to lights ("lights" are $C_1$ to $C_5$ products) and iso-$C_6$s to lights as a function of the conversion. FIGS. 1 and 2 graphically depict the ratios of iso-$C_6$s/lights and benzene/lights as a function of n-hexane conversion for Catalysts A, B and C.

Figure 3:
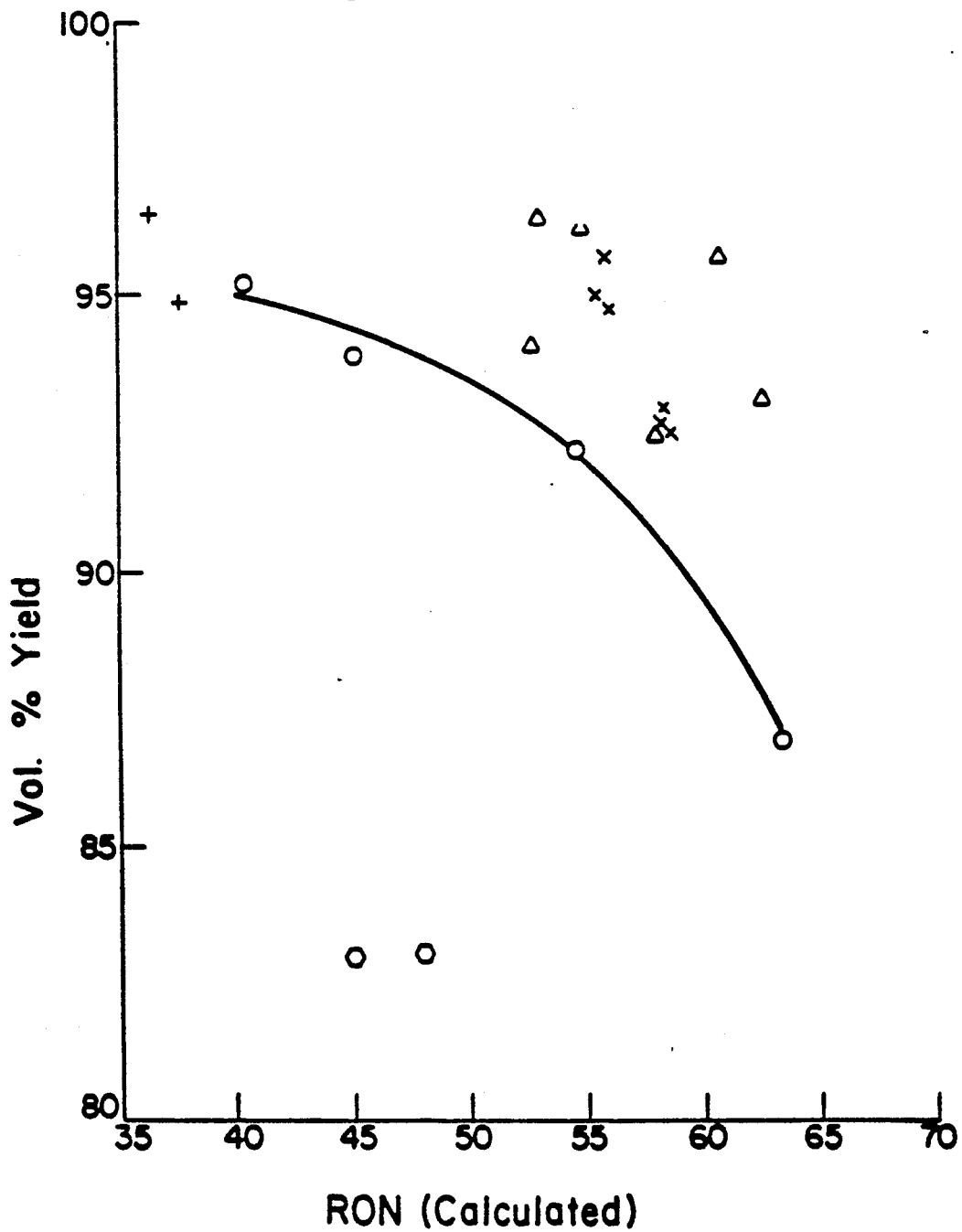
FIG. 3 depicts the relationship between the calculated Volume % Yield and the calculated Research Octane Number (RON) for the products of examples 2 to 9.
Figure 4:
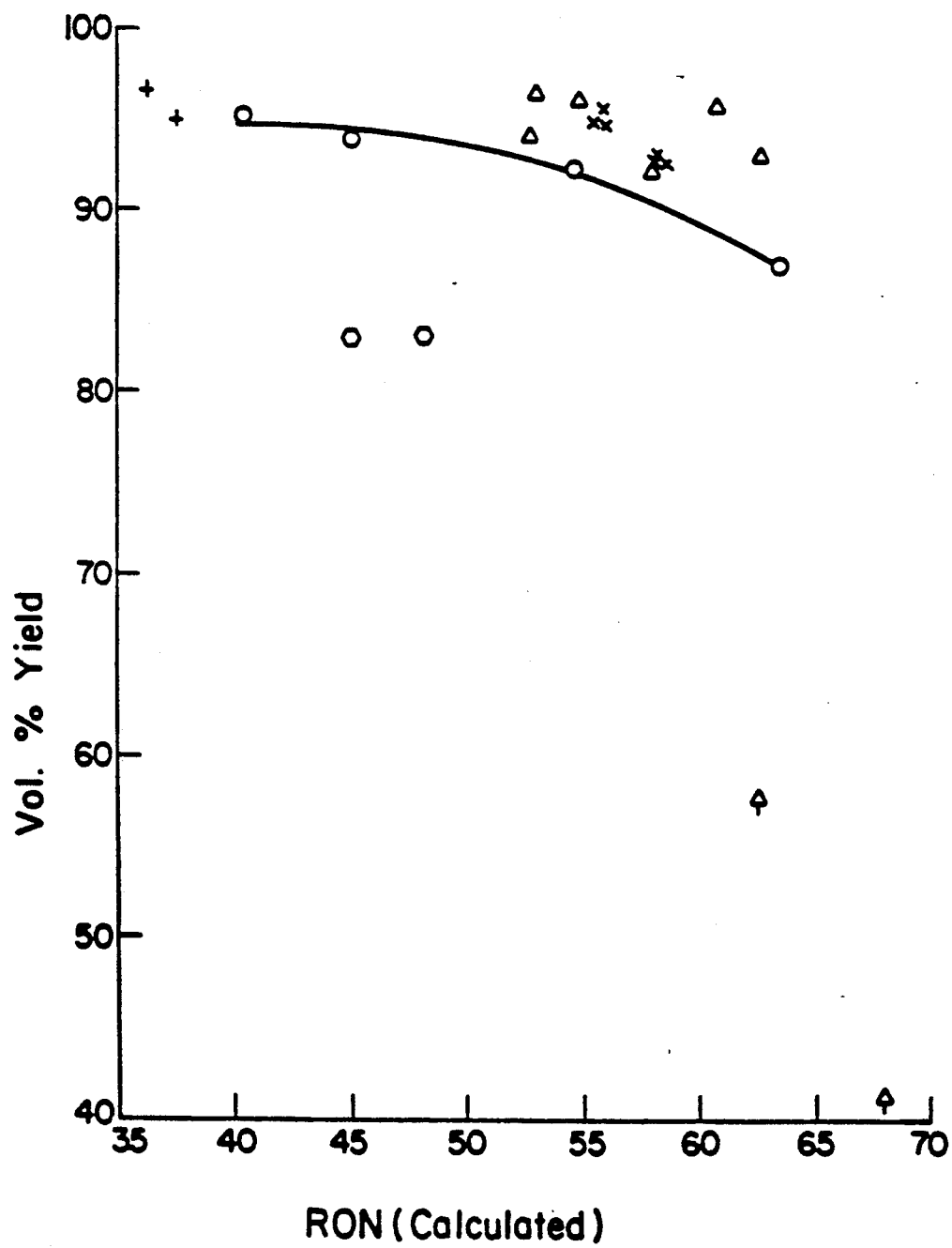
FIG. 4 depicts the relationship between the calculated Volume % Yield and the calculated Research Octane Number (RON) for the products of examples 2 to 10.
Figure 5:
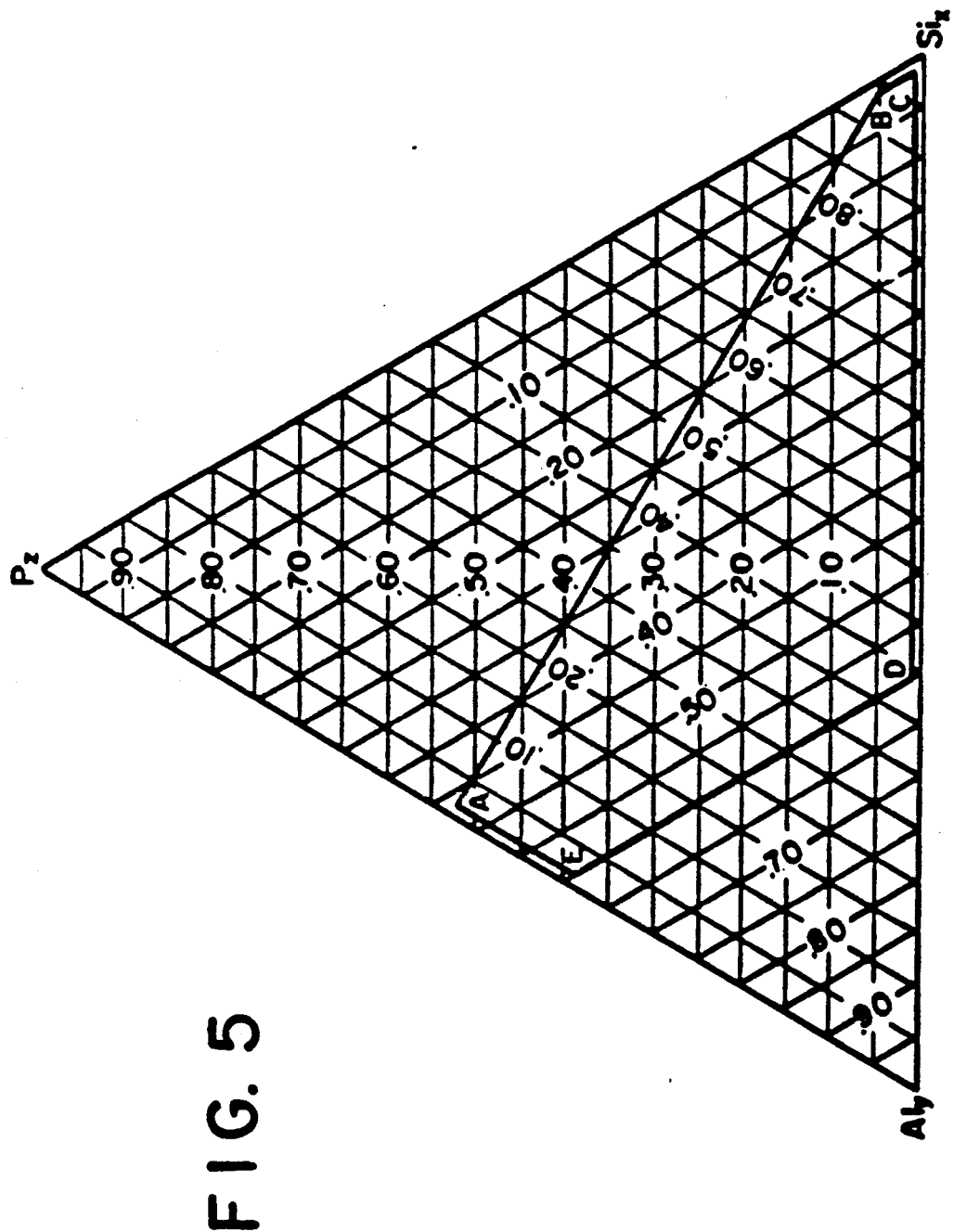
FIG. 5 is a ternary diagram showing the compositional parameters of the silicoaluminophosphates of U.S. Pat. No. 4,440,871 in terms of mole fractions of silicon, aluminum and phosphorus.
Figure 6:
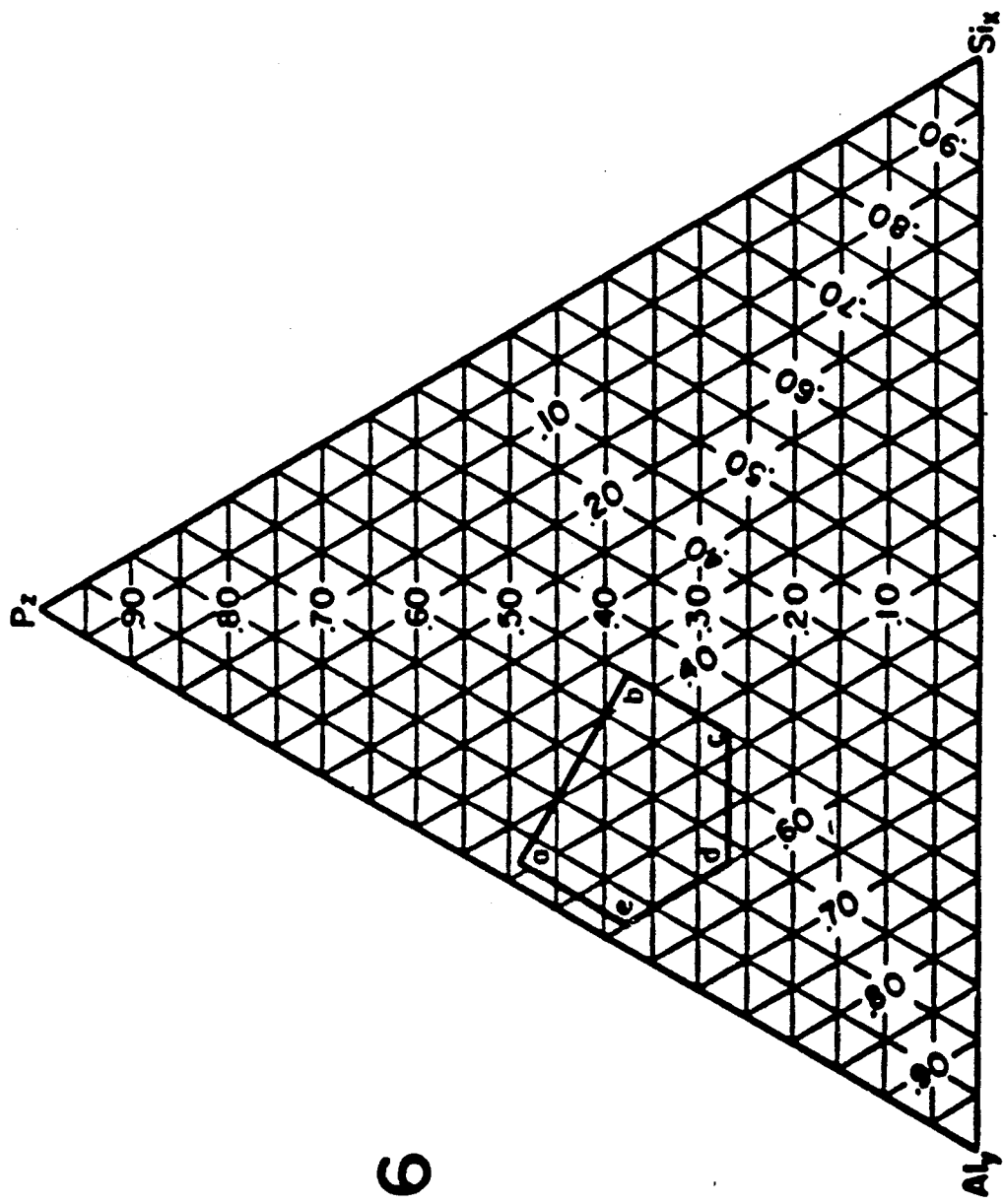
FIG. 6 is a ternary diagram showing the preferred compositional parameters of the silicoaluminophosphates of U.S. Pat. No. 4,440,871 in terms of mole fractions of silicon, aluminum and phosphorus.

FIG. 3 and FIG. 4 (containing different scales) graphically depict the volume % yield as a function of the Research Octane Number (RON) for Catalysts A, B and C. The RON (calculated) and $C_5+$ Yield for each catalyst was calculated using the components containing or more carbon atoms, as above described.

For Reference Catalyst A, the average of the two data points at 20 and 21 hours from Table I-1 showed that 95.05 weight percent of the total hydrocarbon product is $C_5$ or $C_6$ and the $C_5+$ product is 95.23 volume percent of the n-hexane feed from which it was derived. The calculated RON for the $C_5+$ product was 40.41. Table I-2 shows that the corresponding values for a 900° F. reaction temperature were 94.22 weight percent $C_5+$, 93.89 volume percent $C_5+$ and a RON of 45.00. Analysis of the sample taken at 20 hours in Table I-1 gave a 94.9 weight percent $C_5$-$C_6$ product (95.1 volume percent), a calculated RON of 39.7, 1.7 weight percent benzene, 20.7 weight percent isohexanes (ISO), 5.2 weight percent $C_1$-$C_4$ gases (HC), and ISO/HC ratio of 4.1 and a benzene/HC ratio of 0.37.

The results for Catalyst B (SAPO-11) in Table II-1 at 20 hours gave a 97.4 weight percent yield (96.9 volume percent), a calculated RON of 55.4, 2.9 weight percent benzene, 39.4 weight percent isohexanes (ISO), 2.6 weight percent $C_1$-$C_4$ gases (HC), an ISO/HC weight ratio of 15.0 and a benzene/HC ratio of 1.1. These results demonstrate the improved selectivity to higher octane products of Catalyst B, as compared to Catalyst A. The improvement in the calculated RON of the products from 39.7 to 55.4 occurred with a concurrent increase in the yield (weight percent and volume percent).

The results for Comparative Catalyst C (containing SAPO-5) for the product sampled at 20.25 hours in Table III-1 gave a 97.1 weight percent yield of $C_5$-$C_6$ products (96.7 volume percent yield), a calculated RON of products of 36.5, 1.0 weight percent benzene, 11.1 weight percent isohexanes (ISO), 2.9 weight percent $C_1$-$C_4$ gases (HC), an ISO/HC ratio of 3.8 and a benzene/HC ratio of 0.35. A comparison of results obtained by use of Catalyst C and the results obtained by use of Reference Catalyst A demonstrates that the addition of SAPO-5 to Reference Catalyst A did not improve the selectivity to gasoline products. In contrast, a comparison of the results from Reference Catalyst A and Comparative Catalyst C (SAPO-5) with the results obtained by use of Catalyst B (SAPO-11) demonstrates the significant improvement that use of Catalyst B (SAPO-11) had on the calculated RON of the products. This improvement is graphically depicted in FIG. 3 where the solid line denotes Reference Catalyst A and wherein it is shown the Catalyst B (SAPO-11) provides improvement over Reference Catalyst A.

TABLE I-1

| (Catalyst A(Ref))[1] | | |
|---|---|---|
| GC PRODUCT ANALYSIS: (WEIGHT PERCENT): | | |
| METHANE | 0.83 | 0.75 |
| ETHANE | 0.90 | 0.79 |
| PROPANE | 2.26 | 2.02 |
| ISOBUTANE | 0.00 | 0.05 |
| N-BUTANE | 1.23 | 1.07 |
| ISO-PENTANE | 0.21 | 0.19 |
| N-PENTANE | 1.89 | 1.84 |
| TOTAL LIGHTS ($C_5-$) | 7.31 | 6.72 |
| 2,2 DIMETHYL BUTANE | 0.14 | 0.15 |
| 2 METHYL PENTANE | 11.23 | 11.66 |
| 3 METHYL PENTANE | 9.32 | 9.83 |
| N-HEXANE | 65.45 | 63.78 |
| METHYL CYCLOPENTANE (MCP) | 4.88 | 5.59 |
| CYCLOHEXANE | 0.00 | 0.06 |
| TOTAL $C_6$ SATURATES | 91.01 | 91.07 |
| BENZENE | 1.67 | 2.21 |
| CALCULATIONS: | | |
| RON (CALCULATED) | 40.41[2] | —[2] |
| VOLUME % YIELD | 95.23[2] | —[2] |
| METHANE/PROPANE | 0.37 | 0.37 |
| ISO-BUTANE/N-BUTANE | 0.00 | 0.05 |
| ISO-PENTANE/N-PENTANE | 0.11 | 0.10 |
| CONVERSION (Vol. %) | 24.21 | 26.14 |
| BENZENE SEL. %[3] | 6.91 | 8.46 |
| LIGHTS SEL. %[3] | 30.20 | 25.70 |
| MCP SEL. % | −19.90 | −15.70 |
| ISO-$C_6$ SEL. %[3] | 69.15 | 67.91 |
| HOURS ON STREAM | 20.0 | 21.0 |

TABLE I-1-continued

| (Catalyst A(Ref))[1] | | |
|---|---|---|
| TEMPERATURE (°F.) | 860 | 860 |

[1]Catalyst Weight: 0.359 grams.
[2]Average value of both samples.
[3]Figures 1 & 2 use average values of both samples.

TABLE I-2

| (Catalyst A(Ref.))[1] | | |
|---|---|---|
| GC PRODUCT ANALYSIS: (WEIGHT PERCENT): | | |
| METHANE | 0.74 | 0.92 |
| ETHANE | 0.83 | 1.07 |
| PROPANE | 1.98 | 2.48 |
| ISOBUTANE | 0.07 | 0.12 |
| N-BUTANE | 0.96 | 1.27 |
| ISO-PENTANE | 0.24 | 0.24 |
| N-PENTANE | 1.39 | 1.58 |
| TOTAL LIGHTS ($C_5-$) | 6.23 | 7.68 |
| 2,2 DIMETHYL BUTANE | 0.36 | 0.35 |
| 2 METHYL PENTANE | 12.90 | 12.35 |
| 3 METHYL PENTANE | 10.73 | 10.24 |
| N-HEXANE | 60.00 | 59.43 |
| METHYL CYCLOPENTANE (MCP) | 6.71 | 6.61 |
| CYCLOHEXANE | 0.00 | 0.00 |
| TOTAL $C_6$ SATURATES | 90.70 | 88.97 |
| BENZENE | 3.07 | 3.35 |
| CALCULATIONS: | | |
| RON (CALCULATED) | 45.00[2] | —[2] |
| VOLUME % YIELD | 93.89[2] | —[2] |
| METHANE/PROPANE | 0.38 | 0.37 |
| ISO-BUTANE/N-BUTANE | 0.08 | 0.10 |
| ISO-PENTANE/N-PENTANE | 0.17 | 0.15 |
| CONVERSION (Vol. %) | 30.52 | 31.19 |
| BENZENE SEL. %[3] | 10.05 | 10.74 |
| LIGHTS SEL. %[3] | 20.43 | 24.62 |
| MCP SEL. % | −9.76 | −9.90 |
| ISO-$C_6$ SEL. %[3] | 65.65 | 60.90 |
| HOURS ON STREAM | 25.00 | 26.25 |
| TEMPERATURE (°F.) | 902 | 901 |

[1]Catalyst Weight: 0.359 grams.
[2]Average value of both samples.
[3]Figures 1 & 2 use average values of both samples.

TABLE II-1

| (Catalyst B (SAPO-11))[1] | | |
|---|---|---|
| GC PRODUCT ANALYSIS: (WEIGHT PERCENT): | | |
| METHANE | 0.14 | 0.21 |
| ETHANE | 0.25 | 0.39 |
| PROPANE | 1.83 | 2.93 |
| ISOBUTANE | 0.06 | 0.07 |
| N-BUTANE | 0.35 | 0.35 |
| ISO-PENTANE | 0.14 | 0.11 |
| N-PENTANE | 0.30 | 0.27 |
| TOTAL LIGHTS ($C_5-$) | 3.07 | 4.33 |
| 2,2 DIMETHYL BUTANE | 0.42 | 0.31 |
| 2 METHYL PENTANE | 22.31 | 21.20 |
| 3 METHYL PENTANE | 16.72 | 16.09 |
| N-HEXANE | 45.57 | 46.46 |
| METHYL CYCLOPENTANE (MCP) | 8.95 | 9.02 |
| CYCLOHEXANE | 0.09 | 0.07 |
| TOTAL $C_6$ SATURATES | 94.06 | 93.16 |
| BENZENE | 2.87 | 2.51 |
| CALCULATIONS: | | |
| RON (CALCULATED) | 54.89[2] | —[2] |
| VOLUME % YIELD | 96.25[2] | —[2] |
| METHANE/PROPANE | 0.08 | 0.07 |
| ISO-BUTANE/N-BUTANE | 0.17 | 0.20 |
| ISO-PENTANE/N-PENTANE | 0.47 | 0.42 |
| CONVERSION (Vol. %) | 47.23 | 46.19 |
| BENZENE SEL. %[3] | 6.08 | 5.43 |
| LIGHTS SEL. %[3] | 6.50 | 9.38 |
| MCP SEL. % | −1.57 | −1.45 |
| ISO-$C_6$ SEL. %[3] | 75.35 | 73.00 |
| HOURS ON STREAM | 20.00 | 23.00 |

TABLE II-1-continued

| (Catalyst B (SAPO-11))[1] | | |
|---|---|---|
| TEMPERATURE (°F.) | 862 | 863.6 |

[1]Catalyst Weight: 0.350 grams.
[2]Average value of both samples.
[3]Figures 1 & 2 use average values of both samples.

TABLE II-2

| (Catalyst B (SAPO-11))[1] | | |
|---|---|---|
| GC PRODUCT ANALYSIS: (WEIGHT PERCENT): | | |
| METHANE | 0.33 | 0.24 |
| ETHANE | 0.69 | 0.43 |
| PROPANE | 5.47 | 2.80 |
| ISOBUTANE | 0.28 | 0.11 |
| N-BUTANE | 0.82 | 0.58 |
| ISO-PENTANE | 0.26 | 0.26 |
| N-PENTANE | 0.44 | 0.47 |
| TOTAL LIGHTS ($C_5-$) | 8.30 | 4.88 |
| 2,2 DIMETHYL BUTANE | 0.74 | 0.81 |
| 2 METHYL PENTANE | 22.89 | 23.59 |
| 3 METHYL PENTANE | 17.58 | 17.93 |
| N-HEXANE | 39.11 | 41.28 |
| METHYL CYCLOPENTANE | 7.61 | 7.61 |
| CYCLOHEXANE | 0.10 | 0.07 |
| TOTAL $C_6$ SATURATES | 88.02 | 91.28 |
| BENZENE | 3.68 | 3.84 |
| CALCULATIONS: | | |
| RON (CALCULATED) | 58.00[2] | —[2] |
| VOLUME % YIELD | 92.50[2] | —[2] |
| METHANE/PROPANE | 0.06 | 0.08 |
| ISO-BUTANE/N-BUTANE | 0.34 | 0.20 |
| ISO-PENTANE/N-PENTANE | 0.59 | 0.54 |
| CONVERSION (Vol. %) | 54.72 | 58.54 |
| BENZENE SEL. %[3] | 6.73 | 6.55 |
| LIGHTS SEL. %[3] | 15.16 | 8.34 |
| MCP SEL. % | −3.81 | 12.72 |
| ISO-$C_6$ SEL. %[3] | 68.28 | 71.95 |
| HOURS ON STREAM | 25.00 | 26.25 |
| TEMPERATURE (°F.) | 902 | 901 |

[1]Catalyst Weight: 0.350 grams.
[2]Average value of both samples.
[3]Figures 1 & 2 use average values of both samples.

TABLE III-1

| (Catalyst C (SAPO-5))[1] | | |
|---|---|---|
| GC PRODUCT ANALYSIS (WEIGHT PERCENT): | | |
| METHANE | 0.00 | 0.00 |
| ETHANE | 0.27 | 0.15 |
| PROPANE | 2.42 | 1.94 |
| ISOBUTANE | 0.46 | 0.44 |
| N-BUTANE | 0.31 | 0.35 |
| ISO-PENTANE | 0.32 | 0.34 |
| N-PENTANE | 0.14 | 0.14 |
| TOTAL LIGHTS ($C_5-$) | 3.92 | 3.36 |
| 2,2 DIMETHYL BUTANE | 0.10 | 0.09 |
| 2 METHYL PENTANE | 4.63 | 4.52 |
| 3 METHYL PENTANE | 6.64 | 6.62 |
| N-HEXANE | 73.51 | 73.80 |
| METHYL CYCLOPENTANE (MCP) | 10.28 | 10.59 |
| CYCLOHEXANE | 0.10 | 0.00 |
| TOTAL $C_6$ SATURATES | 95.26 | 95.62 |
| BENZENE | 0.82 | 1.01 |
| CALCULATIONS: | | |
| RON (CALCULATED) | 36.27[2] | —[2] |
| VOLUME % YIELD | 96.52[2] | —[2] |
| METHANE/PROPANE | 0.00 | 0.00 |
| ISO-BUTANE/N-BUTANE | 1.48 | 1.26 |
| ISO-PENTANE/N-PENTANE | 2.27 | 2.40 |
| CONVERSION (Vol. %) | 14.88 | 14.54 |
| BENZENE SEL. %[3] | 5.52 | 6.97 |
| LIGHTS SEL. %[3] | 26.33 | 23.13 |
| MCP SEL. % | 3.93 | 6.17 |
| ISO-$C_6$ SEL. %[3] | 50.58 | 50.09 |
| HOURS ON STREAM | 19.50 | 20.25 |

TABLE III-1-continued

| (Catalyst C (SAPO-5))[1] | | |
|---|---|---|
| TEMPERATURE (°F.) | 859 | 859 |

[1]Catalyst Weight: 0.354 grams.
[2]Average value of both samples.
[3]Figures 1 & 2 use average values of both samples.

TABLE III-2

| (Catalyst C (SAPO-5))[1] | | |
|---|---|---|
| GC PRODUCT ANALYSIS (WEIGHT PERCENT): | | |
| METHANE | 0.09 | 0.11 |
| ETHANE | 0.42 | 0.46 |
| PROPANE | 3.29 | 3.16 |
| ISOBUTANE | 0.54 | 0.40 |
| N-BUTANE | 0.50 | 0.39 |
| ISO-PENTANE | 0.32 | 0.24 |
| N-PENTANE | 0.21 | 0.19 |
| TOTAL LIGHTS ($C_5-$) | 5.37 | 4.94 |
| 2,2 DIMETHYL BUTANE | 0.17 | 0.12 |
| 2 METHYL PENTANE | 5.53 | 4.96 |
| 3 METHYL PENTANE | 7.42 | 6.96 |
| N-HEXANE | 70.41 | 70.81 |
| METHYL CYCLOPENTANE | 9.69 | 10.55 |
| CYCLOHEXANE | 0.23 | 0.22 |
| TOTAL $C_6$ SATURATES | 93.45 | 93.62 |
| BENZENE | 1.18 | 1.44 |
| CALCULATIONS: | | |
| RON (CALCULATED) | 37.58[2] | —[2] |
| VOLUME % YIELD | 94.91[2] | —[2] |
| METHANE/PROPANE | 0.03 | 0.03 |
| ISO-BUTANE/N-BUTANE | 1.07 | 1.03 |
| ISO-PENTANE/N-PENTANE | 1.51 | 1:24 |
| CONVERSION (Vol. %) | 18.47 | 18.01 |
| BENZENE SEL. %[3] | 6.37 | 7.98 |
| LIGHTS SEL. %[3] | 29.10 | 27.45 |
| MCP SEL. % | −0.04 | 4.75 |
| ISO-$C_6$ SEL. %[3] | 50.94 | 46.18 |
| HOURS ON STREAM | 22.00 | 24.25 |
| TEMPERATURE (°F.) | 901 | 900 |

[1]Catalyst Weight: 0.354 grams.
[2]Average value of both samples.
[3]Figures 1 & 2 use average values of both samples.

EXAMPLE 3

A catalyst according to the instant invention was prepared according to the procedure employed in example 1(b) using a SAPO-11 prepared by a procedure similar to that employed in example 1(b). The catalyst was denominated "Catalyst D" and evaluated according to the procedure described in example 2. The results of this evaluation are set forth in Tables IV-1 (860° F.) and IV-2 (900° F.) and are graphically depicted in FIGS. 1 to 4. The performance of Catalyst D is similar to that of Catalyst B. The products obtained by use of Catalyst D show improvement in the product distribution and improvement in the calculated RON of the products when compared to that observed by use of Reference Catalyst A.

TABLE IV-1

| (Catalyst D (SAPO-11))[1] | | |
|---|---|---|
| GC PRODUCT ANALYSIS (WEIGHT PERCENT): | | |
| METHANE | 0.00 | 0.00 |
| ETHANE | 0.14 | 0.15 |
| PROPANE | 2.28 | 2.51 |
| ISOBUTANE | 0.11 | 0.13 |
| N-BUTANE | 0.21 | 0.22 |
| ISO-PENTANE | 0.15 | 0.15 |
| N-PENTANE | 0.10 | 0.11 |
| TOTAL LIGHTS ($C_5-$) | 2.99 | 3.27 |
| 2,2 DIMETHYL BUTANE | 0.55 | 0.69 |
| 2 METHYL PENTANE | 19.35 | 19.73 |
| 3 METHYL PENTANE | 15.22 | 15.48 |

TABLE IV-1-continued (Catalyst D (SAPO-11))[1]

| | | |
|---|---|---|
| N-HEXANE | 49.71 | 48.25 |
| METHYL CYCLOPENTANE (MCP) | 8.67 | 8.36 |
| CYCLOHEXANE | 0.15 | 0.44 |
| TOTAL $C_6$ SATURATES | 93.64 | 92.95 |
| BENZENE | 3.37 | 3.77 |
| CALCULATIONS: | | |
| RON (CALCULATED) | 53.05[2] | —[2] |
| VOLUME % YIELD | 96.46[2] | —[2] |
| METHANE/PROPANE | 0.00 | 0.00 |
| ISO-BUTANE/N-BUTANE | 0.53 | 0.57 |
| ISO-PENTANE/N-PENTANE | 1.53 | 1.37 |
| CONVERSION (Vol. %) | 42.44 | 44.13 |
| BENZENE SEL. %[3] | 7.93 | 8.55 |
| LIGHTS SEL. %[3] | 7.05 | 7.42 |
| MCP SEL. % | −2.42 | −3.02 |
| ISO-$C_6$ SEL. %[3] | 73.79 | 73.41 |
| HOURS ON STREAM | 20.50 | 21.50 |
| TEMPERATURE (°F.) | 860 | 865 |

[1]Catalyst Weight: 0.340 grams.
[2]Average value of both samples.
[3]Figures 1 & 2 use average values of both samples.

TABLE IV-2

(Catalyst D (SAPO-11))[1]

| GC PRODUCT ANALYSIS (WEIGHT PERCENT): | | |
|---|---|---|
| METHANE | 0.08 | 0.07 |
| ETHANE | 0.28 | 0.27 |
| PROPANE | 4.00 | 3.85 |
| ISOBUTANE | 0.17 | 0.16 |
| N-BUTANE | 0.46 | 0.37 |
| ISO-PENTANE | 0.22 | 0.16 |
| N-PENTANE | 0.20 | 0.16 |
| TOTAL LIGHTS ($C_5-$) | 5.39 | 5.02 |
| 2,2 DIMETHYL BUTANE | 0.77 | 0.74 |
| 2 METHYL PENTANE | 17.93 | 17.57 |
| 3 METHYL PENTANE | 14.79 | 14.55 |
| N-HEXANE | 48.74 | 49.80 |
| METHYL CYCLOPENTANE (MCP) | 8.12 | 8.47 |
| CYCLOHEXANE | 0.16 | 0.34 |
| TOTAL $C_6$ SATURATES | 90.51 | 91.46 |
| BENZENE | 4.10 | 3.52 |
| CALCULATIONS: | | |
| RON (CALCULATED) | 52.79[2] | —[2] |
| VOLUME % YIELD | 94.13[2] | —[2] |
| METHANE/PROPANE | 0.02 | 0.02 |
| ISO-BUTANE/N-BUTANE | 0.37 | 1.43 |
| ISO-PENTANE/N-PENTANE | 1.12 | 1.00 |
| CONVERSION (Vol. %) | 43.56 | 42.34 |
| BENZENE SEL. %[3] | 9.42 | 8.31 |
| LIGHTS SEL. %[3] | 12.38 | 11.87 |
| MCP SEL. % | −3.62 | −2.89 |
| ISO-$C_6$ SEL. %[3] | 68.18 | 69.08 |
| HOURS ON STREAM | 24.25 | 26.00 |
| TEMPERATURE (°F.) | 900 | 902 |

[1]Catalyst Weight: 0.340 grams.
[2]Average value of both samples.
[3]Figures 1 & 2 use average values of both samples.

EXAMPLE 4

A Reference Catalyst E was prepared to contain 0.52 weight percent chloride. This catalyst contained a higher chloride content than Reference Catalyst A of example 1. Reference Catalyst E was prepared similar to Catalyst A using an alumina carrier, except Reference Catalyst E did not contain a silica binder as was employed in Reference Catalyst A. Reference Catalyst E was prepared by mixing 17.6 grams of an alumina (CATAPAL) with 1.8 grams of concentrated nitric acid and 26.4 grams of distilled water. The peptized alumina was mixed with 75.8 grams of a calcined alumina (CATAPAL) (calcined at 540° C. in air for 16 hours to an LOI (Loss On Ignition) of 1.4 weight percent to form a gamma alumina). The mixture was then extruded into 1/16-inch extrudates and dried overnight in air at 110° C. The extrudates were then calcined at 540° C. for 3 hours. The calcined extrudates had a pore volume of 67.5 milliliter per gram and were pore filled with 0.560 grams of $H_2PtCl_6$ in 0.77 grams of concentrated HCl in water. The resulting product was dried overnight in air at 110° C. and calcined in air at 540° C. for 3 hours. The catalyst was denominated Reference "Catalyst E". Catalyst E was evaluated according to the procedures employed for Catalyst A in Example 2. The results of this evaluation are set forth in Table V-1 to V-2 and are graphically depicted in FIGS. 1 to 4. Reference Catalyst E gave similar selectivity with higher activity (as a result of the higher chloride content) than Reference Catalyst A.

TABLE V-1

(Reference Catalyst E)[1]

| GC PRODUCT ANALYSIS (WEIGHT PERCENT): | | |
|---|---|---|
| METHANE | 1.30 | 1.03 |
| ETHANE | 1.63 | 1.30 |
| PROPANE | 2.83 | 2.31 |
| ISOBUTANE | 0.60 | 0.52 |
| N-BUTANE | 1.99 | 1.70 |
| ISO-PENTANE | 0.86 | 0.74 |
| N-PENTANE | 2.17 | 1.94 |
| TOTAL LIGHTS ($C_5-$) | 11.38 | 9.53 |
| 2,2 DIMETHYL BUTANE | 3.10 | 2.99 |
| 2 METHYL PENTANE | 20.94 | 20.97 |
| 3 METHYL PENTANE | 14.44 | 14.90 |
| N-HEXANE | 42.16 | 43.49 |
| METHYL CYCLOPENTANE (MCP) | 3.10 | 3.04 |
| CYCLOHEXANE | 0.00 | 0.00 |
| TOTAL $C_6$ SATURATES | 83.74 | 85.38 |
| BENZENE | 4.89 | 5.08 |
| CALCULATIONS: | | |
| RON (CALCULATED) | 54.64[2] | —[2] |
| VOLUME % YIELD | 92.22[2] | —[2] |
| METHANE/PROPANE | 0.46 | 0.44 |
| ISO-BUTANE/N-BUTANE | 0.30 | 0.31 |
| ISO-PENTANE/N-PENTANE | 0.40 | 0.38 |
| CONVERSION (Vol. %) | 51.18 | 49.64 |
| BENZENE SEL. %[3] | 9.55 | 10.24 |
| LIGHTS SEL. %[3] | 22.23 | 19.21 |
| MCP SEL. % | −12.88 | −13.41 |
| ISO-$C_6$ SEL. %[3] | 67.47 | 70.33 |
| HOURS ON STREAM | 20.75 | 21.50 |
| TEMPERATURE (°F.) | 860 | 861 |

[1]Catalyst Weight: 0.350 grams.
[2]Average value of both samples.
[3]Figures 1 & 2 use average values of both samples.

TABLE V-2

(Reference Catalyst E)[1]

| GC PRODUCT ANALYSIS (WEIGHT PERCENT): | | |
|---|---|---|
| METHANE | 1.87 | 1.67 |
| ETHANE | 2.56 | 2.31 |
| PROPANE | 4.00 | 3.56 |
| ISOBUTANE | 1.50 | 1.38 |
| N-BUTANE | 2.83 | 2.49 |
| ISO-PENTANE | 1.96 | 1.80 |
| N-PENTANE | 2.72 | 2.58 |
| TOTAL LIGHTS ($C_5-$) | 17.44 | 15.79 |
| 2,2 DIMETHYL BUTANE | 4.83 | 4.88 |
| 2 METHYL PENTANE | 22.19 | 22.72 |
| 3 METHYL PENTANE | 14.92 | 15.57 |
| N-HEXANE | 28.84 | 30.18 |
| METHYL CYCLOPENTANE (MCP) | 2.73 | 2.72 |
| CYCLOHEXANE | 0.00 | 0.00 |
| TOTAL $C_6$ SATURATES | 73.52 | 76.07 |
| BENZENE | 9.04 | 8.14 |
| CALCULATIONS: | | |
| RON (CALCULATED) | 63.47[2] | —[2] |
| VOLUME % YIELD | 86.97[2] | —[2] |
| METHANE/PROPANE | 0.47 | 0.47 |

TABLE V-2-continued (Reference Catalyst E)[1]

| | | |
|---|---|---|
| ISO-BUTANE/N-BUTANE | 0.53 | 0.55 |
| ISO-PENTANE/N-PENTANE | 0.72 | 0.70 |
| CONVERSION (Vol. %) | 66.60 | 65.05 |
| BENZENE SEL. %[3] | 13.57 | 12.52 |
| LIGHTS SEL. %[3] | 26.19 | 24.27 |
| MCP SEL. % | −10.45 | −10.72 |
| ISO-C$_6$ SEL. %[3] | 57.05 | 60.29 |
| HOURS ON STREAM | 24.00 | 25.00 |
| TEMPERATURE (°F.) | 901 | 900 |

[1]Catalyst Weight: 0.350 grams.
[2]Average value of both samples.
[3]Figures 1 & 2 use average values of both samples.

EXAMPLE 5

A catalyst was prepared using a Pt/Cl-alumina component prepared in a similar manner to Reference Catalyst A of example 1(a) and by using a SAPO-11 prepared according to the procedure described in example 1(b). The SAPO-11 product contained essentially no impurity phases as a result of its preparation. As above mentioned, the Pt/Cl-alumina was as prepared as in example 1(a), except the Pt/Cl-alumina component was calcined at 500° C. (instead of 260° C.) for 2 hours in air prior to admixture with the SAPO-11 and silica. The catalyst (denominated as "Catalyst F") was prepared similar to Catalyst B. Catalyst F was evaluated according to the procedure described in Example 2. The results of this evaluation are reported in Tables VI-1 (860° F) and VI-2 (900 F) and are graphically depicted in FIGS. 1 to 4. Comparison of the results for Catalyst F and Reference Catalysts A and E show the improvement in the calculated RON of products obtained by use of Catalyst F.

TABLE VI-1

(CATALYST F (SAPO-11))[1]

| GC PRODUCT ANALYSIS (WEIGHT PERCENT): | | |
|---|---|---|
| METHANE | 0.11 | 0.10 |
| ETHANE | 0.25 | 0.23 |
| PROPANE | 2.76 | 2.67 |
| ISOBUTANE | 0.13 | 0.14 |
| N-BUTANE | 0.32 | 0.34 |
| ISO-PENTANE | 0.21 | 0.19 |
| N-PENTANE | 0.22 | 0.19 |
| TOTAL LIGHTS (C$_5$−) | 4.00 | 3.86 |
| 2,2 DIMETHYL BUTANE | 1.43 | 1.37 |
| 2 METHYL PENTANE | 27.18 | 26.55 |
| 3 METHYL PENTANE | 19.90 | 19.76 |
| N-HEXANE | 36.50 | 36.98 |
| METHYL CYCLOPENTANE (MCP) | 5.65 | 5.98 |
| CYCLOHEXANE | 0.08 | 0.08 |
| TOTAL C$_6$ SATURATES | 90.73 | 90.73 |
| BENZENE | 5.27 | 5.41 |
| CALCULATIONS: | | |
| RON (CALCULATED) | 60.86[2] | —[2] |
| VOLUME % YIELD | 95.78[2] | —[2] |
| METHANE/PROPANE | 0.04 | 0.04 |
| ISO-BUTANE/N-BUTANE | 0.40 | 0.42 |
| ISO-PENTANE/N-PENTANE | 0.97 | 0.97 |
| CONVERSION (Vol. %) | 57.74 | 57.18 |
| BENZENE SEL. %[3] | 9.13 | 9.47 |
| LIGHTS SEL. %[3] | 6.93 | 6.75 |
| MCP SEL. % | −7.00 | −6.49 |
| ISO-C$_6$ SEL. %[3] | 77.31 | 76.64 |
| HOURS ON STREAM | 20.00 | 21.25 |
| TEMPERATURE (°F.) | 858 | 860 |

[1]Catalyst Weight: 0.350 grams.
[2]Average value of both samples.
[3]FIGS. 1 & 2 use average values of both samples.

TABLE VI-2

(CATALYST F (SAPO-11))[1]

| GC PRODUCT ANALYSIS (WEIGHT PERCENT): | | |
|---|---|---|
| METHANE | 0.20 | 0.19 |
| ETHANE | 0.48 | 0.48 |
| PROPANE | 4.37 | 4.43 |
| ISOBUTANE | 0.31 | 0.31 |
| N-BUTANE | 0.53 | 0.55 |
| ISO-PENTANE | 0.32 | 0.34 |
| N-PENTANE | 0.33 | 0.33 |
| TOTAL LIGHTS (C$_5$−) | 6.53 | 6.63 |
| 2,2 DIMETHYL BUTANE | 2.35 | 2.24 |
| 2 METHYL PENTANE | 27.07 | 26.73 |
| 3 METHYL PENTANE | 19.88 | 19.57 |
| N-HEXANE | 32.73 | 33.59 |
| METHYL CYCLOPENTANE (MCP) | 4.47 | 4.40 |
| CYCLOHEXANE | 0.07 | 0.04 |
| TOTAL C$_6$ SATURATES | 86.56 | 86.57 |
| BENZENE | 6.90 | 6.80 |
| CALCULATIONS: | | |
| RON (CALCULATED) | 62.65[2] | —[2] |
| VOLUME % YIELD | 93.18[2] | —[2] |
| METHANE/PROPANE | 0.05 | 0.04 |
| ISO-BUTANE/N-BUTANE | 0.58 | 0.55 |
| ISO-PENTANE/N-PENTANE | 0.96 | 1.02 |
| CONVERSION (Vol. %) | 62.09 | 61.10 |
| BENZENE SEL. %[3] | 11.12 | 11.12 |
| LIGHTS SEL. %[3] | 10.52 | 10.85 |
| MCP SEL. % | −8.41 | −8.67 |
| ISO-C$_6$ SEL. %[3] | 73.13 | 73.05 |
| HOURS ON STREAM | 23.50 | 25.25 |
| TEMPERATURE (°F.) | 900 | 901 |

[1]Catalyst Weight: 0.350 grams.
[2]Average value of both samples.
[3]FIGS. 1 & 2 use average values of both samples.

EXAMPLE 6

A catalyst (denominated "Catalyst G") was prepared according to this invention according to the procedure employed to prepare Catalyst B in example 1, except the Pt/Cl-alumina component was as prepared in example 1(a), except it was calcined at 540° C. (instead of 260° C.) for 2 hours and SAPO-41 was employed instead of SAPO-11. SAPO-41 was produced according to the general procedures set forth in U.S. Pat. No. 4,440,871. A reaction mixture was prepared using Kaiser-SAT alumina (70 wt. % Al$_2$O$_3$, 30 wt. % H$_2$O), 85 wt. % H$_3$PO$_4$, CAB-O-SILT EH5 (93.2 wt. % SiO$_2$, 6.9 wt. % H$_2$O), di-n-propylamine (Pr2NH) and water. The reaction mixture was heated to 200° C. without stirring and held at 200° C. without stirring for 48 hours. A SAPO-41 product was obtained. Chemical analysis of the SAPO-41 product gave the following

| | Weight Percent |
|---|---|
| Al$_2$O$_3$ | 34.9 |
| P$_2$O$_5$ | 43.0 |
| SiO$_2$ | 10.6 |
| Carbon | 5.5 |
| Nitrogen | 1.1 |
| LOI (Loss On Ignition) | 11.4 |

The product was calcined at above 450° C. in air to remove organic templating agent.

Catalyst G was evaluated according to the procedure described in example 2 at process temperatures of 860° F. and 900° F. Comparison of the products obtained by use of Catalyst G and Catalyst E show that Catalyst G is more active and more selective to higher octane products than products obtained using Reference Catalysts A and E. The results of this evaluation are set forth in Tables VII-1 and VII-2 and are graphically depicted in FIGS. 1 to 4.

TABLE VII-1

(CATALYST G (SAPO-41))[1]

| GC PRODUCT ANALYSIS (WEIGHT PERCENT): | | |
|---|---|---|
| METHANE | 0.12 | 0.12 |
| ETHANE | 0.41 | 0.43 |
| PROPANE | 3.36 | 3.52 |
| ISOBUTANE | 0.21 | 0.25 |
| N-BUTANE | 0.50 | 0.54 |
| ISO-PENTANE | 0.14 | 0.16 |
| N-PENTANE | 0.21 | 0.20 |
| TOTAL LIGHTS ($C_5-$) | 4.95 | 5.22 |
| 2,2 DIMETHYL BUTANE | 1.04 | 0.99 |
| 2 METHYL PENTANE | 22.89 | 22.27 |
| 3 METHYL PENTANE | 17.36 | 16.87 |
| N-HEXANE | 42.83 | 44.09 |
| METHYL CYCLOPENTANE (MCP) | 6.95 | 6.97 |
| CYCLOHEXANE | 0.04 | 0.10 |
| TOTAL $C_6$ SATURATES | 91.11 | 91.29 |
| BENZENE | 3.93 | 3.49 |
| CALCULATIONS: | | |
| RON (CALCULATED) | 55.97[2] | —[2] |
| VOLUME % YIELD | 94.79[2] | —[2] |
| METHANE/PROPANE | 0.04 | 0.03 |
| ISO-BUTANE/N-BUTANE | 0.42 | 0.46 |
| ISO-PENTANE/N-PENTANE | 0.69 | 0.79 |
| CONVERSION (Vol. %) | 50.40 | 48.95 |
| BENZENE SEL. %[3] | 7.80 | 7.14 |
| LIGHTS SEL. %[3] | 9.83 | 10.66 |
| MCP SEL. % | −5.45 | −5.56 |
| ISO-$C_6$ SEL. %[3] | 74.17 | 74.12 |
| HOURS ON STREAM | 20.00 | 21.00 |
| TEMPERATURE (°F.) | 862 | 862 |

[1]Catalyst Weight: 0.350 grams.
[2]Average value of both samples.
[3]FIGS. 1 & 2 use average values of both samples.

TABLE VII-2

(CATALYST G (SAPO-41))[1]

| GC PRODUCT ANALYSIS (WEIGHT PERCENT): | | |
|---|---|---|
| METHANE | 0.18 | 0.18 |
| ETHANE | 0.59 | 0.61 |
| PROPANE | 4.48 | 4.64 |
| ISOBUTANE | 0.31 | 0.32 |
| N-BUTANE | 0.72 | 0.71 |
| ISO-PENTANE | 0.23 | 0.22 |
| N-PENTANE | 0.33 | 0.28 |
| TOTAL LIGHTS ($C_5-$) | 6.84 | 6.96 |
| 2,2 DIMETHYL BUTANE | 1.62 | 1.46 |
| 2 METHYL PENTANE | 23.87 | 23.39 |
| 3 METHYL PENTANE | 17.99 | 17.71 |
| N-HEXANE | 38.62 | 39.98 |
| METHYL CYCLOPENTANE (MCP) | 5.84 | 5.98 |
| CYCLOHEXANE | 0.10 | 0.04 |
| TOTAL $C_6$ SATURATES | 88.04 | 88.56 |
| BENZENE | 5.12 | 4.48 |
| CALCULATIONS: | | |
| RON (CALCULATED) | 58.30[2] | —[2] |
| VOLUME % YIELD | 93.02[2] | —[2] |
| METHANE/PROPANE | 0.04 | 0.04 |
| ISO-BUTANE/N-BUTANE | 0.43 | 0.45 |
| ISO-PENTANE/N-PENTANE | 0.71 | 0.77 |
| CONVERSION (Vol. %) | 55.28 | 53.70 |
| BENZENE SEL. %[3] | 9.26 | 8.35 |
| LIGHTS SEL. %[3] | 12.37 | 12.96 |
| MCP SEL. % | −6.98 | −6.92 |
| ISO-$C_6$ SEL. %[3] | 71.70 | 71.98 |
| HOURS ON STREAM | 24.75 | 25.75 |
| TEMPERATURE (°F.) | 901 | 900 |

[1]Catalyst Weight: 0.350 grams.
[2]Average value of both samples.
[3]FIGS. 1 & 2 use average values of both samples.

EXAMPLE 7

A second sample from the preparation of Catalyst G, as described in example 6, was evaluated as a reforming catalyst as described in example 6 using the procedure described in example 2. The results of this evaluation were similar to those set forth in example 6 and are set forth in Tables VIII-1 (860° F.) and VIII-2 (900° F.).

TABLE VIII-1

(CATALYST G (SAPO-41))[1]

| GC PRODUCT ANALYSIS (WEIGHT PERCENT): | | |
|---|---|---|
| METHANE | 0.13 | 0.13 |
| ETHANE | 0.40 | 0.40 |
| PROPANE | 3.36 | 3.37 |
| ISOBUTANE | 0.10 | 0.14 |
| N-BUTANE | 0.46 | 0.56 |
| ISO-PENTANE | 0.12 | 0.15 |
| N-PENTANE | 0.17 | 0.24 |
| TOTAL LIGHTS ($C_5-$) | 4.74 | 4.98 |
| 2,2 DIMETHYL BUTANE | 0.81 | 0.91 |
| 2 METHYL PENTANE | 22.40 | 22.73 |
| 3 METHYL PENTANE | 16.72 | 16.85 |
| N-HEXANE | 44.45 | 44.03 |
| METHYL CYCLOPENTANE (MCP) | 7.01 | 6.81 |
| CYCLOHEXANE | 0.15 | 0.16 |
| TOTAL $C_6$ SATURATES | 91.55 | 91.48 |
| BENZENE | 3.71 | 3.54 |
| CALCULATIONS: | | |
| RON (CALCULATED) | 55.48[2] | —[2] |
| VOLUME % YIELD | 95.02[2] | —[2] |
| METHANE/PROPANE | 0.04 | 0.04 |
| ISO-BUTANE/N-BUTANE | 0.23 | 0.25 |
| ISO-PENTANE/N-PENTANE | 0.71 | 0.64 |
| CONVERSION (Vol. %) | 48.52 | 49.02 |
| BENZENE SEL. %[3] | 7.65 | 7.22 |
| LIGHTS SEL.[3] | 9.77 | 10.15 |
| MCP SEL. % | −5.52 | −5.89 |
| ISO-$C_6$ SEL. %[3] | 74.47 | 74.87 |
| HOURS ON STREAM | 22.00 | 22.50 |
| TEMPERATURE (°F.) | 859 | 861 |

[1]Catalyst Weight: 0.350 grams.
[2]Average value of both samples.
[3]FIGS. 1 & 2 use average values of both samples.

TABLE VIII-2

(SAPO-41))[1]

| GC PRODUCT ANALYSIS (WEIGHT PERCENT): | |
|---|---|
| METHANE | 0.22 |
| ETHANE | 0.66 |
| PROPANE | 4.85 |
| ISOBUTANE | 0.24 |
| N-BUTANE | 0.72 |
| ISO-PENTANE | 0.30 |
| N-PENTANE | 0.33 |
| TOTAL LIGHTS ($C_5-$) | 7.32 |
| 2,2 DIMETHYL BUTANE | 1.49 |
| 2 METHYL PENTANE | 23.58 |
| 3 METHYL PENTANE | 17.55 |
| N-HEXANE | 38.83 |
| METHYL CYCLOPENTANE (MCP) | 5.83 |
| CYCLOHEXANE | 0.15 |
| TOTAL $C_6$ SATURATES | 87.43 |
| BENZENE | 5.25 |
| CALCULATIONS: | |
| RON (CALCULATED) | 58.57 |
| VOLUME % YIELD | 92.58 |
| METHANE/PROPANE | 0.05 |
| ISO-BUTANE/N-BUTANE | 0.33 |
| ISO-PENTANE/N-PENTANE | 0.91 |
| CONVERSION (Vol %) | 55.04 |
| BENZENE SEL. % | 9.54 |
| LIGHTS SEL. % | 13.30 |
| MCP SEL. % | −7.01 |
| ISO-$C_6$ SEL. % | 70.54 |
| HOURS ON STREAM | 26.25 |
| TEMPERATURE (°F.) | 900 |

[1]Catalyst Weight: 0.3500 grams.

EXAMPLE 8

A catalyst (denominated "Catalyst H") was prepared similar to Catalyst G in example 6, except the SAPO-41 was prepared from a reaction mixture having different molar oxide ratios. The reaction mixture was heated to 200° C. without stirring and held at 200° C. without stirring for 24 hours. A SAPO-41 product was obtained. Chemical analysis of the SAPO-41 product gave the following

|  | Weight Percent |
|---|---|
| $Al_2O_3$ | 39.5 |
| $P_2O_5$ | 39.6 |
| $SiO_2$ | 8.4 |
| Carbon | 4.8 |
| Nitrogen | 0.9 |
| LOI (Loss On Ignition) | 12.4 |

Catalyst H was evaluated according to the procedure described in example 2 and the results are set forth in Tables IX-1 (860° F.) and IX-2 (900° F.) and are graphically depicted in FIGS. 1 to 4. These results are similar to those obtained in examples 6 and 7 and demonstrate the benefits of a catalyst containing SAPO-41 over a similar reference catalyst without SAPO-41.

TABLE IX-1

(CATALYST H (SAPO-41))[1]

| GC PRODUCT ANALYSIS (WEIGHT PERCENT): | | |
|---|---|---|
| METHANE | 0.08 | 0.09 |
| ETHANE | 0.25 | 0.30 |
| PROPANE | 2.84 | 3.20 |
| ISOBUTANE | 0.08 | 0.08 |
| N-BUTANE | 0.33 | 0.37 |
| ISO-PENTANE | 0.10 | 0.08 |
| N-PENTANE | 0.16 | 0.14 |
| TOTAL LIGHTS ($C_5$−) | 3.84 | 4.27 |
| 2,2 DIMETHYL BUTANE | 0.63 | 0.69 |
| 2 METHYL PENTANE | 21.69 | 23.43 |
| 3 METHYL PENTANE | 16.69 | 17.88 |
| N-HEXANE | 45.58 | 42.66 |
| METHYL CYCLOPENTANE | 8.16 | 7.93 |
| CYCLOHEXANE | 0.13 | 0.12 |
| TOTAL $C_6$ SATURATES | 92.87 | 92.71 |
| BENZENE | 3.30 | 3.02 |
| CALCULATIONS: | | |
| RON (CALCULATED) | 55.95[2] | —[2] |
| VOLUME % YIELD | 95.71[2] | —[2] |
| METHANE/PROPANE | 0.03 | 0.03 |
| ISO-BUTANE/N-BUTANE | 0.24 | 0.22 |
| ISO-PENTANE/N-PENTANE | 0.65 | 0.59 |
| CONVERSION (Vol %) | 47.22 | 50.60 |
| BENZENE SEL. %[3] | 6.98 | 5.97 |
| LIGHTS SEL. %[3] | 8.12 | 8.43 |
| MCP SEL. % | −3.25 | −3.49 |
| ISO-$C_6$ SEL. %[3] | 74.51 | 75.45 |
| HOURS ON STREAM | 20.00 | 21.00 |
| TEMPERATURE (°F.) | 859 | 860 |

[1]Catalyst Weight: 0.350 grams.
[2]Average value of both samples.
[3]FIGS. 1 & 2 use average values of both samples.

TABLE IX-2

(CATALYST H (SAPO-41))[1]

| GC PRODUCT ANALYSIS (WEIGHT PERCENT): | | |
|---|---|---|
| METHANE | 0.17 | 0.16 |
| ETHANE | 0.58 | 0.51 |
| PROPANE | 5.10 | 4.80 |
| ISOBUTANE | 0.31 | 0.21 |
| N-BUTANE | 0.74 | 0.60 |
| ISO-PENTANE | 0.21 | 0.18 |
| N-PENTANE | 0.24 | 0.23 |
| TOTAL LIGHTS ($C_5$−) | 7.34 | 6.69 |
| 2,2 DIMETHYL BUTANE | 1.29 | 1.14 |
| 2 METHYL PENTANE | 23.40 | 22.70 |
| 3 METHYL PENTANE | 18.12 | 17.29 |
| N-HEXANE | 38.59 | 40.43 |
| METHYL CYCLOPENTANE (MCP) | 6.73 | 6.77 |
| CYCLOHEXANE | 0.16 | 0.13 |
| TOTAL $C_6$ SATURATES | 88.30 | 88.45 |
| BENZENE | 4.36 | 4.86 |
| CALCULATIONS: | | |
| RON (CALCULATED) | 58.24[2] | —[2] |
| VOLUME % YIELD | 92.72[2] | —[2] |
| METHANE/PROPANE | 0.03 | 0.03 |
| ISO-BUTANE/N-BUTANE | 0.42 | 0.34 |
| ISO-PENTANE/N-PENTANE | 0.85 | 0.79 |
| CONVERSION (Vol. %) | 55.31 | 53.18 |
| BENZENE SEL. %[3] | 7.88 | 9.13 |
| LIGHTS SEL. %[3] | 13.28 | 12.58 |
| MCP SEL. % | −5.35 | −5.50 |
| ISO-$C_6$ SEL. %[3] | 70.55 | 50.15 |
| HOURS ON STREAM | 24.50 | 26.50 |
| TEMPERATURE (°F.) | 900 | 900 |

[1]Catalyst Weight: 0.350 grams.
[2]Average value of both samples.
[3]FIGS. 1 & 2 use average values of both samples.

EXAMPLE 9

A comparative catalyst (denominated "Catalyst I") was prepared employing the preparative procedure employed for Catalyst B in example 1, except SAPO-34 was substituted for SAPO-11. The preparation of SAPO-34 is described in examples 32 to 38 of U.S. Patent No. 4,440,871, incorporated herein by reference. SAPO-34 is a small pore silicoaluminophosphate and is not characterized by the adsorption characteristics for isobutane characteristic of the MP-SAPOs employed in the catalysts and processes of the instant invention.

Catalyst I was evaluated according to the procedure described in example 2, above. The results of this evaluation are set forth in Tables X-1 (860° F.) and X-2 (900° F.) and are graphically depicted in FIGS. 1 to 4. Catalyst I gave products having iso $C_6$'s/light and benzene/lights ratios less than that obtained by use of Reference Catalyst A. In addition, the plot of Volume % Yield vs. RON (calculated) in FIG. 3 shows Catalyst I was inferior to Reference Catalyst A and to catalysts containing SAPO-11 and SAPO-41.

TABLE X-1

(COMPARATIVE CATALYST I (SAPO-34))[1]

| GC PRODUCT ANALYSIS (WEIGHT PERCENT): | | |
|---|---|---|
| METHANE | 0.14 | 0.13 |
| ETHANE | 1.01 | 0.94 |
| PROPANE | 14.31 | 13.07 |
| ISOBUTANE | 0.04 | 0.04 |
| N-BUTANE | 1.69 | 1.59 |
| ISO-PENTANE | 0.07 | 0.07 |
| N-PENTANE | 0.57 | 0.51 |
| TOTAL LIGHTS ($C_5$−) | 17.83 | 16.35 |
| 2,2 DIMETHYL BUTANE | 0.27 | 0.28 |
| 2 METHYL PENTANE | 10.54 | 10.11 |
| 3 METHYL PENTANE | 8.94 | 8.83 |
| N-HEXANE | 51.43 | 52.92 |
| METHYL CYCLOPENTANE (MCP) | 8.75 | 9.08 |
| CYCLOHEXANE | 0.04 | 0.10 |
| TOTAL $C_6$ SATURATES | 79.98 | 81.32 |
| BENZENE | 2.19 | 2.33 |
| CALCULATIONS: | | |
| RON (CALCULATED) | 45.14[2] | —[2] |
| VOLUME % YIELD | 82.96 | —[2] |
| METHANE/PROPANE | 0.01 | 0.01 |
| ISO-BUTANE/N-BUTANE | 0.02 | 0.03 |
| ISO-PENTANE/N-PENTANE | 0.12 | 0.13 |

TABLE X-1-continued

(COMPARATIVE CATALYST I (SAPO-34))[1]

| | | |
|---|---|---|
| CONVERSION (Vol. %) | 40.45 | 38.72 |
| BENZENE SEL. %[3] | 5.42 | 6.02 |
| LIGHTS SEL. %[3] | 44.08 | 42.22 |
| MCP SEL. % | −2.33 | −1.59 |
| ISO-C$_6$ SEL. %[3] | 39.19 | 39.70 |
| HOURS ON STREAM | 19.75 | 21.00 |
| TEMPERATURE (°F.) | 861 | 862 |

[1]Catalyst Weight: 0.350 grams.
[2]Average value of both samples.
[3]FIGS. 1 & 2 use average values of both samples.

TABLE X-2

(Comparative Catalyst I (SAPO-34))[1]

| GC PRODUCT ANALYSIS (WEIGHT PERCENT): | | |
|---|---|---|
| METHANE | 0.22 | ·0.20 |
| ETHANE | 1.39 | 1.29 |
| PROPANE | 13.71 | 11.66 |
| ISOBUTANE | 0.12 | 0.15 |
| N-BUTANE | 1.88 | 1.89 |
| ISO-PENTANE | 0.12 | 0.16 |
| N-PENTANE | 0.58 | 0.54 |
| TOTAL LIGHTS (C$_5$−) | 18.01 | 15.90 |
| 2,2 DIMETHYL BUTANE | 0.54 | 0.49 |
| 2 METHYL PENTANE | 12.51 | 12.30 |
| 3 METHYL PENTANE | 10.29 | 10.38 |
| N-HEXANE | 47.58 | 49.02 |
| METHYL CYCLOPENTANE (MCP) | 7.68 | 8.08 |
| CYCLOHEXANE | 0.09 | 0.08 |
| TOTAL C$_6$ SATURATES | 78.69 | 80.35 |
| BENZENE | 3.29 | 3.75 |
| CALCULATIONS: | | |
| RON (CALCULATED) | 48.19[2] | —[2] |
| VOLUME % YIELD | 83.01[2] | —[2] |
| METHANE/PROPANE | 0.02 | 0.02 |
| ISO-BUTANE/N-BUTANE | 0.07 | 0.08 |
| ISO-PENTANE/N-PENTANE | 0.21 | 0.29 |
| CONVERSION (Vol. %) | 44.90 | 43.24 |
| BENZENE SEL. %[3] | 7.34 | 8.67 |
| LIGHTS SEL. %[3] | 40.12 | 36.78 |
| MCP SEL. % | −4.48 | −3.73 |
| ISO-C$_6$ SEL. %[3] | 43.39 | 44.63 |
| HOURS ON STREAM | 24.50 | 25.75 |
| TEMPERATURE (°F.) | 899 | 900 |

[1]Catalyst Weight: 0.350 grams.
[2]Average value of both samples.
[3]FIGS. 1 & 2 use average values of both samples.

EXAMPLE 10

A comparative catalyst (denominated "Catalyst J") was prepared similar to the preparation of Catalyst B in Example 1, above, except silicalite was substituted for SAPO-11. Silicalite and its preparation are disclosed in U.S. Pat. No. 4,061,724, incorporated herein by reference. Silicalite is a crystalline silica material having a characteristic adsorption for isobutane and triethylamine within the adsorption criteria described for MP-SAPO. Silicalite has a pore size of about 6 Angstroms.

Catalyst J was evaluated according to the procedure described in example 2 and the results of that evaluation are set forth in Tables XI-1 (860° F.) and XI-2 (900° F.) and are graphically depicted in FIGS. 1, 2 and 4. The results of the evaluation show that, although silicalite is characterized by adsorption criteria similar to MP-NZMSs, silicalite does not provide the benefits provided by catalysts containing MP-NZMS(s), as indicated by the large yield losses associated with use of the silicalite-containing Catalyst J.

TABLE XI-1

COMPARATIVE CATALYST J (Silicalite))[1]

| GC PRODUCT ANALYSIS (WEIGHT PERCENT): | | |
|---|---|---|
| METHANE | 0.33 | 0.35 |
| ETHANE | 3.57 | 3.81 |
| PROPANE | 27.92 | 27.76 |
| ISOBUTANE | 2.51 | 2.66 |
| N-BUTANE | 7.37 | 7.39 |
| ISO-PENTANE | 2.06 | 1.94 |
| N-PENTANE | 2.58 | 2.48 |
| TOTAL LIGHTS (C$_5$−) | 46.34 | 46.39 |
| 2,2 DIMETHYL BUTANE | 0.79 | 0.77 |
| 2 METHYL PENTANE | 14.03 | 14.51 |
| 3 METHYL PENTANE | 10.32 | 10.68 |
| N-HEXANE | 21.06 | 19.65 |
| METHYL CYCLOPENTANE (MCP) | 3.10 | 3.00 |
| CYCLOHEXANE | 0.11 | 0.09 |
| TOTAL C$_6$ SATURATES | 49.40 | 48.71 |
| BENZENE | 4.26 | 4.90 |
| CALCULATIONS: | | |
| RON (CALCULATED) | 62.55[2] | —[2] |
| VOLUME % YIELD | 57.69[2] | —[2] |
| METHANE/PROPANE | 0.01 | 0.01 |
| ISO-BUTANE/N-BUTANE | 0.34 | 0.36 |
| ISO-PENTANE/N-PENTANE | 0.80 | 0.79 |
| CONVERSION (Vol. %) | 75.62 | 77.25 |
| BENZENE SEL. %[3] | 5.63 | 6.35 |
| LIGHTS SEL. %[3] | 61.29 | 60.05 |
| MCP SEL. % | −8.72 | −8.66 |
| ISO-C$_6$ SEL. %[3] | 28.16 | 28.62 |
| HOURS ON STREAM | 19.75 | 22.00 |
| TEMPERATURE (°F.) | 861 | 861 |

[1]Catalyst Weight: 0.350 grams.
[2]Average value of both samples.
[3]FIGS. 1 & 2 use average values of both samples.

TABLE XI-2

(COMPARATIVE CATALYST J (Silicalite))[1]

| GC PRODUCT ANALYSIS (WEIGHT PERCENT): | | |
|---|---|---|
| METHANE | 0.62 | 0.69 |
| ETHANE | 5.37 | 6.38 |
| PROPANE | 40.12 | 37.10 |
| ISOBUTANE | 3.42 | 3.79 |
| N-BUTANE | 8.68 | 9.46 |
| ISO-PENTANE | 1.96 | 1.93 |
| N-PENTANE | 2.01 | 2.23 |
| TOTAL LIGHTS (C$_5$−) | 62.16 | 61.58 |
| 2,2 DIMETHYL BUTANE | 0.92 | 0.76 |
| 2 METHYL PENTANE | 11.01 | 10.28 |
| 3 METHYL PENTANE | 7.73 | 7.66 |
| N-HEXANE | 11.32 | 11.69 |
| METHYL CYCLOPENTANE (MCP) | 1.53 | 1.62 |
| CYCLOHEXANE | 0.07 | 0.08 |
| TOTAL C$_6$ SATURATES | 32.57 | 32.10 |
| BENZENE | 5.26 | 6.32 |
| CALCULATIONS: | | |
| RON (CALCULATED) | 67.90[2] | —[2] |
| VOLUME % YIELD | 41.36[2] | —[2] |
| METHANE/PROPANE | 0.02 | 0.02 |
| ISO-BUTANE/N-BUTANE | 0.39 | 0.40 |
| ISO-PENTANE/N-PENTANE | 0.97 | 0.86 |
| CONVERSION (Vol. %) | 86.89 | 86.47 |
| BENZENE SEL. %[3] | 6.06 | 7.31 |
| LIGHTS SEL. % | 71.54 | 71.22 |
| MCP SEL. % | −9.40 | −9.33 |
| ISO-C$_6$ SEL. %[3] | 18.16 | 17.16 |
| HOURS ON STREAM | 25.00 | 25.75 |
| TEMPERATURE (°F.) | 901 | 899 |

[1]Catalyst Weight: 0.350 grams.
[2]Average value of both samples.
[3]FIGS. 1 & 2 use average values of both samples.

EXAMPLE 11

A Commercial Reforming Catalyst (Commercial Reference Catalyst K) was evaluated and compared with a catalyst containing the same commercial reforming catalyst in admixture with a SAPO-11 component.

The commercial reforming catalyst comprised a Group VIII metal on chlorinated-alumina catalyst typical of the Group VIII, chlorinated-alumina catalysts employed in commercial reforming processes. The commercial reforming catalyst was ground to form 20-40 mesh (U.S. Standard) particles and then calcined in air at 480° C. for 2 hours. This catalyst was denominated Reference "Catalyst K".

A catalyst according to the instant invention was prepared by employing Reference Catalyst K and a silica-bonded SAPO-11 component. The SAPO-11 component was prepared as set forth in example 17 of U.S. Pat. No. 4,440,871, except the digestion time was 40 hours. The SAPO-11 was calcined and blended with a silica sol (LUDOX TM), extruded, dried and calcined in air, as described in part b) of example 1. The SAPO-II/silica component was prepared to contain 87 weight percent SAPO-11 and 13 weight percent $SiO_2$, expressed on an anhydrous basis. The calcined SAPO-11/silica extrudates were ground to a 20-40 mesh (U.S. Standard). A catalyst according to the instant invention was prepared by forming a physical mixture containing 90 weight percent of commercial reforming Catalyst K and 10 weight percent of the SAPO-11/silica component (expressed as anhydrous weight percents). The catalyst was denominated "Catalyst L" and contained 90 weight percent Catalyst K, 8.7 wt. % SAPO-11 and 1.3 wt % $SiO_2$.

Catalyst L and Reference Catalyst K were evaluated as reforming catalysts with a naphtha feedstock having the following characterization:

| | |
|---|---|
| Aromatics* | 15.6 Wt. % |
| Naphthenes* | 24.5 Wt. % |
| Paraffins* | 44.8 Wt. % |
| Unidentified Component(s)* | 12.1 Wt. % |
| Average Molecular Wt.* | 116.6 grams/mole |
| RON (Calculated) | 47.2 |
| Calculated Density | 0.7604 |

*Calculated by capillary gas chromatographic analysis of the individual feedstock components Each catalyst was tested by placing 8.6 grams the 20-40 mesh, tubular reactor having a bed length of about 4.5 inches and an inside diameter of 0.43 inches. The reactor and catalyst bed were purged with nitrogen and then with hydrogen at 1 atmosphere (zero (0) psig) and at a flow rate of 250 cc/min. The catalyst was heated from room temperature to 900° F. over a period of 3 to 4 hours and then maintained at 900° F. for 1 hour with the hydrogen purge. The catalyst was then sulfided by increasing the hydrogen flow rate to 380 cc/min and by adding hydrogen sulfide to the hydrogen stream at a rate of 20 cc/min. The hydrogen sulfide addition was continued for 10 minutes while the catalyst was maintained at 900° F. The reactor was then purged for 30 minutes with a hydrogen purge (380 cc/min). Each catalyst was then evaluated by heating the specific catalyst to the desired reaction temperature. The reactor was pressurized to 200 psig and a feedstream containing a 3 to 1 molar ratio of hydrogen to the naphtha feedstock introduced to the reactor at 28 cc/hour (Weight Hourly Space Velocity 2.5). The liquid product was collected and analyzed by capillary gas chromatographic procedures. The gas products were monitored by dry test meters and analyzed by gas chromatographic procedures. The liquid products analysis typically identified greater than 95 weight percent of the products. The acceptable product sample mixtures were determined by evaluating the mass balances for the sample and by requiring a mass balance between the feedstock and products of from greater than 99 percent to 101 percent by weight.

Catalysts K and L were evaluated and the RON and $C_5$+Volume % Yield calculated, as above described. The evaluation of each catalyst was carried out to provide a comparable Volume % Yield for each catalyst and to provide a mass balance greater than 99 percent to 101 percent by weight. This required the use of a lower reaction temperature for the more active Catalyst L (SAPO-11). Products were collected after about 65 to 66 hours on stream and evaluated. The following results were obtained:

| | Commercial Reference Catalyst K | SAPO-11-containing Catalyst L |
|---|---|---|
| Reaction Temperature (°F.) | 940° F. | 921° F. |
| Pressure (psig) | 200 psig | 200 psig |
| $H_2$/Naphtha (Molar ratio) | 3.07 | 3.11 |
| WHSV | 2.37 | 2.28 |
| Mass Balance (Wt. %) | 99.8 | 99.2 |
| Time on Stream (hours) | 66.8 | 65.1 |
| Calculated RON ($C_5$+) | 93.8 | 94.4 |
| Calculated $C_5$+ (Vol. % Yield) | 87.3 | 87.1 |

The above results demonstrate that at comparable and $C_5$+Vol. % Yield that Catalyst L was a calculated RON more active catalyst than Catalyst K. The increased activity of Catalyst K is indicated by the use of a lower reaction temperature, 921° F., as compared to 940° C. for Reference Catalyst K, to achieve similar calculated RON and $C_5$+Volume % Yield. The ability to employ a lower reaction temperature without a concurrent loss in octane and/or yield is beneficial in both lowering the overall cost of the reforming process and permits the processing of large feedstock volumes to produce products having comparable octane. In addition, the products produced by use of Catalyst L at the lower process temperature and at a comparable $C_5$+Vol. % Yield showed a comparable and even slightly higher calculated RON than the products obtained by use of Commercial Reference Catalyst K.

EXAMPLE 12

SAPO-11 and SAPO-5 prepared according to Example 1 (b) and (c), respectively, were characterized in order to contrast potential NZMS components of a reforming catalyst with respect to the parameters of the invention. Adsorption capacities were measured on the calcined product using a standard McBain-Baker gravimetric adsorption apparatus. The following data were obtained on samples activated at 350° F.:

| Triethylamine Adsorption: | Pressure Torr | Temp., °C. | Weight % Adsorbed |
|---|---|---|---|
| SAPO-11 | 2.65 | 22° | 2.5 |
| SAPO-5 | 2.65 | 22° | 8.8 |

SAPO-11 also showed 4.5 wt. % isobutane adsorption at 500 Torr and 20° C. SAPO-11 thus represents a MP-NZMS of the invention, having triethylamine adsorption less than 5 wt. %, and even less than the preferred value of 3 wt. %, in contrast to SAPO-5. Both SAPO-11 and SAPO-5 are microporous crystalline silicoaluminophates of U.S. Pat. No. 4,440,871 (Lok et al.), wherein SAPO-11 is estimated to have a pore size of between 6.0 and 6.2 Å. The range of pore size of SAPO-5 was not determined in the '871 patent, but is shown as 7.3 Å in Meier, W. M. and Olson, D. H., *Atlas of Zeolite Structure Types*, 1987 Edition issued by the Structure Commission of the Internation Zeolite Association. The utility of the medium-pore SAPO-11 of the present invention is shown by higher isohexane and benzene yields in Example 2 relative to the larger-pore SAPO-5.

Small-pore SAPO-34 prepared in accordance with Example 9 and U.S. Pat. No. 4,440,871 also was compared, using isobutane adsorption to characterize pore size to SAPO-11, which represents a MP-NZMS of the present invention:

| Isobutane Adsorption: | Pressure Torr | Temp., °C. | Weight % Adsorbed |
|---|---|---|---|
| SAPO-11 | 500 | 20 | 4.5 |
| SAPO-34 | 500 | 20 | 0.7 |

Since SAPO-34 does not attain 2 wt. % isobutane adsorption, SAPO-34 is not an NZMS of the present invention. As discussed in Example 9, SAPO-34 demonstrates inferior yields relative to SAPO-11.

What is claimed is:

1. A reforming process comprising contacting mixed hydrocarbon fraction to obtain a higher-octane product at reforming conditions using a catalyst comprising amounts effective to render the catalyst active as a reforming catalyst of:
   (a) at least one MP-NZMS characterized in the calcined form by an adsorption of isobutane of at least 2 percent by weight at a partial pressure of 500 torr and a temperature of 20° C. and also characterized by an adsorption of triethylamine less than about 5 percent by weight at a partial pressure of 2.6 torr and a temperature of 22° C.;
   (b) an inorganic-oxide carrier;
   (c) a chlorine component; and
   (d) at least one group VII metal component.

2. The process according to claim 1 wherein the adsorption of triethylamine of the MP-NZMS is less than about 3 percent by weight.

3. The process according to claim 1 wherein the inorganic oxide comprises alumina.

4. The process according to claim 3 wherein the chlorine component is present on an elemental as is in the catalyst in an amount of between 0.1 and 2 wt. % of the alumina.

5. The process according to claim 1 wherein the MP-NZMS is present in the catalyst in an amount of between about 10 and 80 wt. %, based on the total weight of the carrier.

6. The process according to claim 1 wherein the Group VIII metal is present in the catalyst on an elemental basis in an amount of between about 0.1 and 2 wt. %, based on the weight of the carrier.

7. The process according to claim 1 wherein the Group VIII metal component comprises at least one platinum-group metal component.

8. The process according to claim 6 wherein the platinum-group metal component comprises a platinum component.

9. The process according to claim 6 wherein the catalyst further comprises a second metal component selected from the group consisting of rhenium, tungsten and tin components.

10. The process according to claim 9 wherein the weight ratio of the platinum-group metal to the second metal is between about 1:5 and 5:1 on an elemental basis.

11. The process according to claim 1 wherein the MP-NZMS is one or more selected from the group of silicoaluminophosphate molecular sieves.

12. The process according to claim 11 wherein the MP-NZMS is one or more from the group consisting of SAPO-11, SAPO-31, SAPO-40 and SAPO-41.

13. The process according to claim 1 comprising a dehydrocyclization process to obtain aromatic components at dehydrocyclization conditions.

14. A reforming process comprising contacting a mixed hydrocarbon fraction to obtain a higher-octane product at reforming conditions using a catalyst comprising amounts effective to render the catalyst active as a reforming catalyst of;
   (a) one or more MP-NZMSs selected from the group consisting of SAPO-11, SAPO-31, SAPO-40 and SAPO-41;
   (b) an alumina carrier;
   (c) a chlorine component present in an amount of between about 0.1 and 2 wt. % on an elemental basis, based on the weight of the carrier; and
   (d) at least one platinum group metal component.

* * * * *